US012734447B2

(12) United States Patent
Jin et al.

(10) Patent No.: US 12,734,447 B2
(45) Date of Patent: Sep. 15, 2026

(54) VIRTUAL CHARACTER OBTAINING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Yuyan Jin, Shenzhen (CN); Tengju He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 158 days.

(21) Appl. No.: 18/745,938

(22) Filed: Jun. 17, 2024

(65) Prior Publication Data

US 2024/0335753 A1 Oct. 10, 2024

Related U.S. Application Data

(63) Continuation of application No. PCT/CN2023/086768, filed on Apr. 7, 2023.

(30) Foreign Application Priority Data

Jun. 9, 2022 (CN) ........................ 202210647410.X

(51) Int. Cl.
*A63F 13/55* (2014.01)
*A63F 13/52* (2014.01)

(52) U.S. Cl.
CPC .............. *A63F 13/55* (2014.09); *A63F 13/52* (2014.09)

(58) Field of Classification Search
CPC ........ A63F 13/55; A63F 13/52; A63F 13/533; A63F 13/58; A63F 13/69; A63F 13/822; A63F 2300/807

(Continued)

(56) References Cited

U.S. PATENT DOCUMENTS 8,814,688 B2 * 8/2014 Barney .................. A63F 13/95 463/40
D923,021 S * 6/2021 Pratt ............................ D14/485

(Continued)

FOREIGN PATENT DOCUMENTS

CN 109999502 A 7/2019
CN 112337105 A 2/2021

(Continued)

OTHER PUBLICATIONS

Tencent Technology, WO, PCT/CN2023/086768, Jul. 8, 2023, 3 pgs.

(Continued)

*Primary Examiner* — Michael A Cuff
(74) *Attorney, Agent, or Firm* — Morgan, Lewis & Bockius LLP

(57) ABSTRACT

This application discloses a method for obtaining a virtual character performed by an electronic device. The method includes: displaying a virtual interaction object in a virtual character obtaining interface, the virtual interaction object comprising a plurality of interaction regions for obtaining a virtual character, each interaction region corresponding to a virtual biological attribute of the virtual character; obtaining a selection operation on a first interaction region of the plurality of interaction regions on the virtual interaction object according to a target interaction manner, a virtual biological attribute corresponding to the first interaction region having a first virtual biological attribute; and obtaining a first virtual character in a target virtual character set in response to the selection operation on the first interaction region and displaying the obtained first virtual character, a virtual biological attribute of a virtual character in the target virtual character set being the first virtual biological attribute.

20 Claims, 12 Drawing Sheets

(58) Field of Classification Search
USPC .............................................................. 463/31
See application file for complete search history.

(56) References Cited

U.S. PATENT DOCUMENTS

2010/0103178 A1* 4/2010 Song .................... G06F 3/03545 345/473
2011/0265041 A1* 10/2011 Ganetakos ............ A63F 13/533 715/834
2012/0308982 A1* 12/2012 Goff ....................... G06Q 10/40 434/362
2013/0194278 A1 8/2013 Zajac, III
2013/0271456 A1* 10/2013 Haswell ................ G06T 19/003 345/420
2015/0130836 A1* 5/2015 Anderson ............... G06F 21/31 345/633
2015/0254275 A1* 9/2015 Kikuchi .................. A63F 13/61 707/751
2016/0217614 A1* 7/2016 Kraver ................. G02B 27/017
2017/0361218 A1* 12/2017 Briggs .................... A63F 13/79
2018/0085668 A1 3/2018 Matsushita et al.
2018/0315127 A1* 11/2018 Chappell ............ G06Q 20/3223
2018/0342095 A1* 11/2018 Walsh ..................... G06F 3/017
2018/0364808 A1* 12/2018 Pahud ................... G06F 3/0482
2019/0043267 A1* 2/2019 Anderson ............... G06F 3/011
2019/0096274 A1* 3/2019 Solomon .................. G09B 7/08
2019/0160379 A1* 5/2019 Matsushita ............. A63F 13/58
2019/0340425 A1 11/2019 Xu et al.
2024/0335753 A1* 10/2024 Jin .......................... A63F 13/55

FOREIGN PATENT DOCUMENTS

CN 112755532 A 5/2021
CN 113893531 A 1/2022
CN 114219896 A 3/2022
JP 2018047100 A 3/2018
JP 2021132713 A 9/2021

OTHER PUBLICATIONS

Tencent Technology, IPRP, PCT/CN2023/086768, Dec. 10, 2024, 4 pgs.

GNOME.org., GNOME Help, “Substitute Clicking with Hovering”, May 2022, Retrieved from the Internet: https://web.archive.org/web/20220524124358/https://help.gnome.org/users/gnome-help/stable/a11y-dwellclick.html.ja.

Pokemongo.gamewith.jp, “[Pokemon GO] How to Choose Eevee’s Evolution | Sylveon Implemented!”, last updated Dec. 2021, Retrieved from the Internet: https://pokemongo.gamewith.jp/article/show/35512.

Tencent Technology, ISR, PCT/CN2023/086768, Jul. 8, 2023, 2 pgs.

* cited by examiner

VIRTUAL CHARACTER OBTAINING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2023/086768, entitled "VIRTUAL CHARACTER OBTAINING METHOD AND APPARATUS, STORAGE MEDIUM, AND ELECTRONIC DEVICE" filed on Apr. 7, 2023, which claims priority to Chinese Patent Application No. 202210647410.X, entitled "VIRTUAL CHARACTER OBTAINING METHOD AND APPARATUS, STORAGE MEDIUM, AND ELECTRONIC DEVICE" filed with the China National Intellectual Property Administration on Jun. 9, 2022, both of which are incorporated herein by reference in their entirety.

FIELD OF THE TECHNOLOGY

This application relates to the field of computers, and specifically, to a virtual character obtaining technology.

BACKGROUND OF THE DISCLOSURE

Virtual characters are character images simulated by people on computers. With the rapid development of computer technologies, virtual characters are widely applied to various fields such as games, films and television, education, and medical treatment.

In many cases, users need to obtain a virtual character in a manner before using the virtual character. Currently, in a process of obtaining a virtual character, users can only randomly obtain the virtual character from all virtual character sets by performing a simple interaction operation. When the simple interaction operation is performed, differentiated behaviors of the users do not really affect a result of obtaining the virtual character. Consequently, interaction behaviors of the users are lack of purpose, it is difficult to really participate in the process of obtaining the virtual character, and it is difficult for the users to obtain a required virtual character according to actual requirements, resulting in a technical problem that the result of obtaining the virtual character is difficult to control and obtaining efficiency of the virtual character is low.

SUMMARY

Embodiments of this application provide a virtual character obtaining method and apparatus, a storage medium, and an electronic device, to resolve at least the technical problem in the related art that a result of obtaining a virtual character is difficult to control and obtaining efficiency of the virtual character is low.

According to an aspect of the embodiments of this application, a method for obtaining a virtual character is performed by an electronic device and the method includes: displaying a virtual interaction object in a virtual character obtaining interface, the virtual interaction object comprising a plurality of interaction regions for obtaining a virtual character, each interaction region corresponding to a virtual biological attribute of the virtual character; obtaining a selection operation on a first interaction region of the plurality of interaction regions on the virtual interaction object according to a target interaction manner, a virtual biological attribute corresponding to the first interaction region having a first virtual biological attribute; and obtaining a first virtual character in a target virtual character set in response to the selection operation on the first interaction region and displaying the obtained first virtual character, a virtual biological attribute of a virtual character in the target virtual character set being the first virtual biological attribute.

According to still another aspect of the embodiments of this application, a non-transitory computer-readable storage medium is further provided, the computer-readable storage medium having a computer program stored therein, and the computer program, when executed by a processor, being configured to perform the foregoing virtual character obtaining method.

According to still another aspect of the embodiments of this application, an electronic device is further provided, including a memory and a processor, the memory having a computer program stored therein, and the processor being configured to perform the foregoing virtual character obtaining method through the computer program.

In the embodiments of this application, the virtual interaction object for obtaining the virtual character is displayed in the virtual character obtaining interface, where the virtual interaction object includes the plurality of interaction regions, each interaction region corresponds to the virtual biological attribute, and the plurality of interaction regions correspond to the plurality of virtual biological attributes; the selection operation on the first interaction region of the plurality of interaction regions according to the target interaction manner is obtained, where the virtual biological attribute corresponding to the first interaction region is the first virtual biological attribute, and the target interaction manner corresponds to the attribute types of the plurality of virtual biological attributes; and the first virtual character is obtained in the target virtual character set in response to the selection operation on the first interaction region and the obtained first virtual character is displayed, where the virtual biological attribute of the virtual character in the target virtual character set is the first virtual biological attribute. The first virtual character in the target virtual character set can be obtained by configuring different interaction regions corresponding to different virtual biological attributes for the virtual interaction object and selecting the first interaction region by using the target interaction manner corresponding to the virtual biological attribute. The interaction regions selected by different users may be different, thereby allowing differential behaviors of the users to affect the obtained virtual character, thereby achieving the technical effects of optimizing the user experience, improving obtaining efficiency of the virtual character, and enabling the user to affect the result of obtaining the virtual character, so that the technical problem in the related art that the result of obtaining the virtual character is difficult to control and the obtaining efficiency of the virtual character is low is resolved.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

To make a person skilled in the art better understand solutions of this application, technical solutions in embodiments of this application are clearly and completely described below with reference to accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", and the like are intended to distinguish between similar objects but do not necessarily indicate a specific order or sequence. The data used in such a way are interchangeable in proper circumstances, so that the embodiments of this application described herein can be implemented in other orders than the order illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

First, some nouns or terms appearing in a process of describing the embodiments of this application are adapted to the following explanations.

Game character: It is a character in a game, particularly a character in a role-playing game.

Role-playing game: The role-playing game is a type of game. In the game, players play one or more characters in a virtual world to play the game, and the players battle, grow, and complete tasks set by the game by operating the game characters.

Character unlocking: It is to obtain the right to control a game character after a specific condition in the game is met.

This application is described below with reference to the embodiments.

Figure 1:
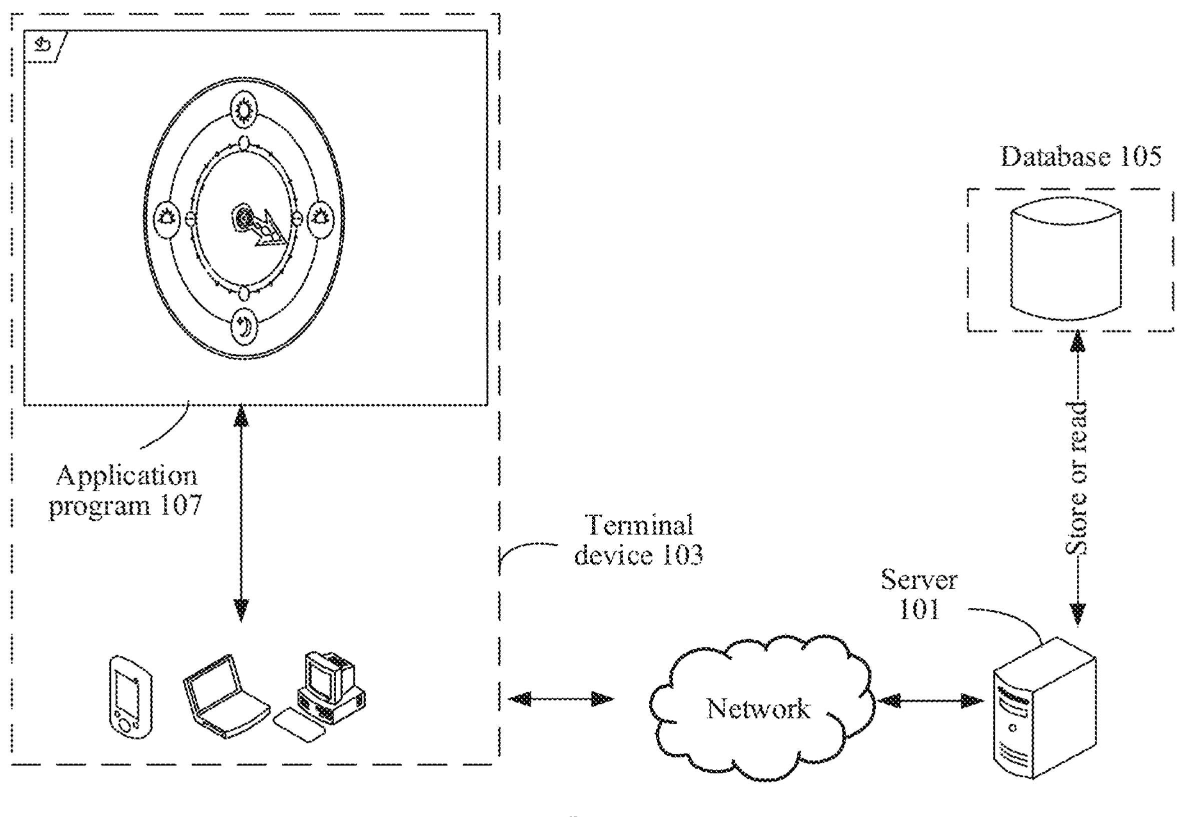
FIG. 1 is a schematic diagram of an application environment of an exemplary virtual character obtaining method according to an embodiment of this application.

According to an aspect of the embodiments of this application, a virtual character obtaining method is provided. In this embodiment, the virtual character obtaining method can be applied to a hardware environment including a server 101 and a terminal device 103 shown in FIG. 1. As shown in FIG. 1, the server 101 is connected to the terminal device 103 via a network, and may be configured to provide a service to a terminal device or an application installed on the terminal device, and the application may be a video application, an instant messaging application, a browser application, an education application, a game application, or the like. A database 105 may be provided on the server or independently of the server, for providing a data storage service for the server 101, such as a game data storage server. The network may include, but is not limited to: a wired network and a wireless network. The wired network includes: a local area network, a metropolitan area network, and a wide area network, and the wireless network includes: Bluetooth, Wi-Fi, and another network implementing wireless communication. The terminal device 103 may be a terminal configured with an application, and may include, but is not limited to, at least one of the following: a mobile phone (for example, an Android mobile phone or an iOS mobile phone), a notebook computer, a tablet computer, a palmtop computer, a mobile Internet device (MID), a PAD, a desktop computer, a smart TV, a smart voice interaction device, a smart home appliance, a vehicle terminal, an aircraft, and another computer device. The server may be a single server, a server cluster including a plurality of servers, or a cloud server. An application program 107 using the virtual character obtaining method is displayed through the terminal device 103 or another connected display device.

With reference to FIG. 1, the virtual character obtaining method may be implemented on the terminal device 103 through the following operations:

S1: Display a virtual interaction object for obtaining a virtual character in a virtual character obtaining interface on a terminal device 103, the virtual interaction object including a plurality of interaction regions, each interaction region corresponding to a virtual biological attribute, and the plurality of interaction regions corresponding to a plurality of virtual biological attributes.

S2: Obtain a selection operation on a first interaction region of the plurality of interaction regions according to a target interaction manner on the terminal device 103, a virtual biological attribute corresponding to the first interaction region being a first virtual biological attribute, and the target interaction manner corresponding to attribute types of the plurality of virtual biological attributes.

S3: Obtain a first virtual character in a target virtual character set on the terminal device 103 in response to the selection operation on the first interaction region and display the obtained first virtual character, a virtual biological attribute of a virtual character in the target virtual character set being the first virtual biological attribute.

In a possible implementation, the virtual character obtaining method can further be implemented by a server, for example, the server 101 shown in FIG. 1; or jointly implemented by a terminal device and a server, that is, an electronic device performing the method provided in the embodiments of this application may be at least one of a terminal device or a server.

The foregoing is merely an example and is not specifically limited in this embodiment.

Figure 2:
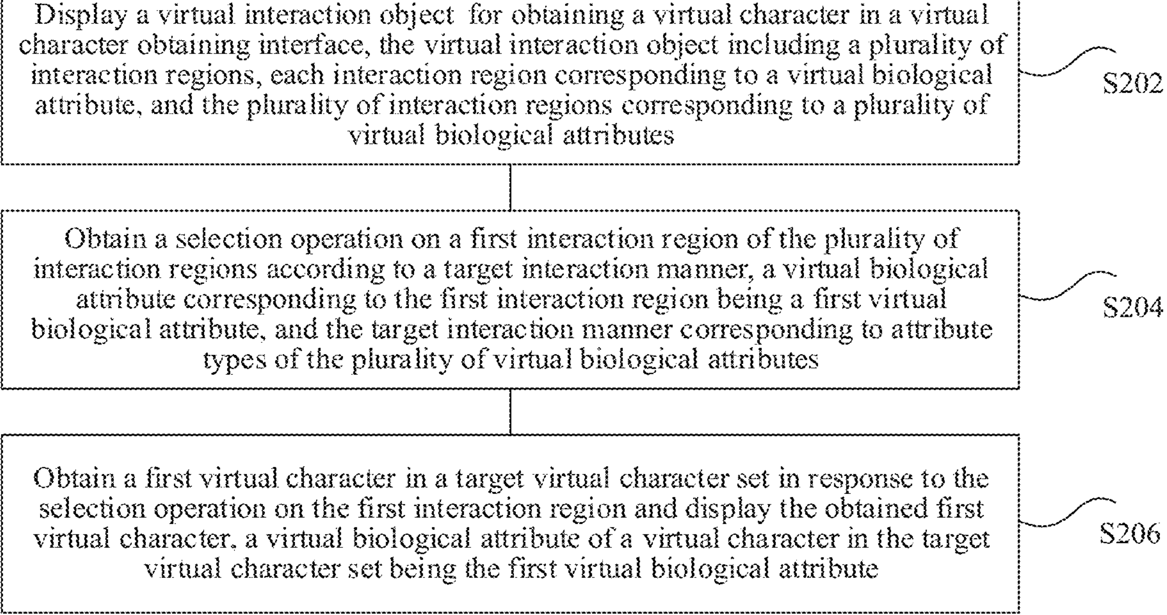
FIG. 2 is a schematic flowchart of an exemplary virtual character obtaining method according to an embodiment of this application.

In a possible implementation, as shown in FIG. 2, the virtual character obtaining method includes the following operations.

S202: Display a virtual interaction object for obtaining a virtual character in a virtual character obtaining interface, the virtual interaction object including a plurality of interaction regions, each interaction region corresponding to a virtual biological attribute, and the plurality of interaction regions corresponding to a plurality of virtual biological attributes.

S204: Obtain a selection operation on a first interaction region of the plurality of interaction regions according to a target interaction manner, a virtual biological attribute corresponding to the first interaction region being a first virtual biological attribute, and the target interaction manner corresponding to attribute types of the plurality of virtual biological attributes.

S206: Obtain a first virtual character in a target virtual character set in response to the selection operation on the first interaction region and display the obtained first virtual character, a virtual biological attribute of a virtual character in the target virtual character set being the first virtual biological attribute.

In a possible implementation, in this embodiment of this application, the virtual character obtaining method may include, but is not limited to, being applied to an application scenario of a game application, a social application, a conference application and the like where a virtual character needs to be obtained. When the virtual character obtaining method is applied to an application scenario of a game application where a virtual character is obtained, the virtual character may be a game character.

The game application may be a multiplayer online battle arena (MOBA) game or a single-player game (SPG). A type of the game application may include, but is not limited to, at least one of the following: a two-dimensional (2D) game application, a three-dimensional (3D) game application, a virtual reality (VR) game application, an augmented reality (AR) game application, and a mixed reality (MR) game application. The foregoing is merely an example, and is not limited in this embodiment.

Figure 3:
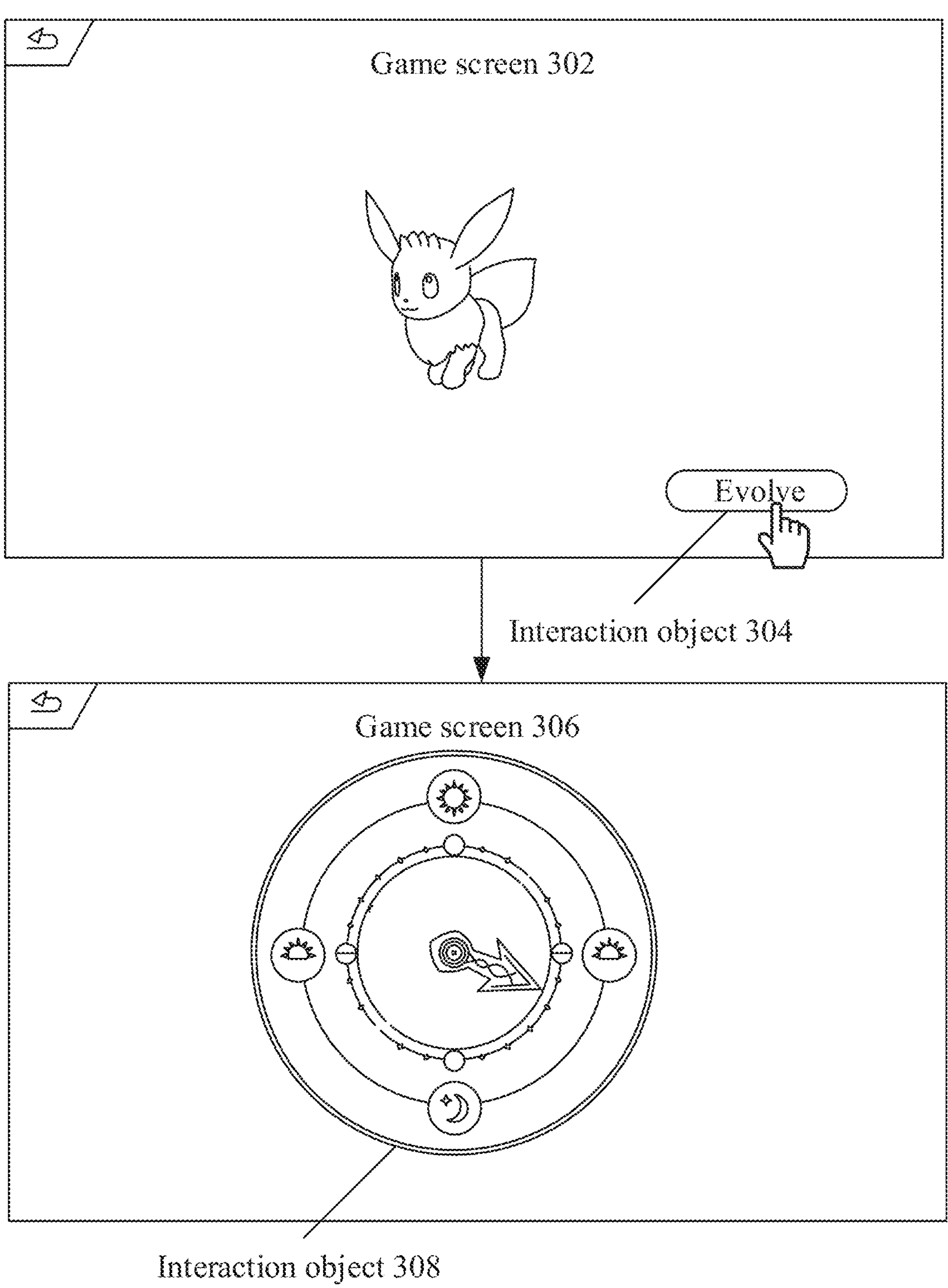
FIG. 3 is a schematic diagram of an exemplary virtual character obtaining method according to an embodiment of this application.

In a possible implementation, in this embodiment of this application, the virtual character obtaining interface may include, but is not limited to, a game interface in the game application that allows to obtain a virtual character, and display of the virtual character obtaining interface may be triggered by a current account logged in the game application through an interaction operation, or may include, but is not limited to, triggered after the current account completes a preset task, or may include, but is not limited to, triggered when a virtual resource carried by the current account meets a preset condition. For example, an example in which the virtual character obtaining method is applied to a game application is used. FIG. 3 is a schematic diagram of an exemplary virtual character obtaining method according to an embodiment of this application. As shown in FIG. 3, the virtual character obtaining interface may include, but is not limited to, being displayed in the following manners.

S1: Display a game screen 302 of a game played by a current account, where the game screen 302 includes an interaction object 304, and the interaction object 304 is configured for triggering display of the virtual character obtaining interface.

S2: Display a game screen 306 in response to an interaction operation performed on the interaction object 304, where the game screen 306 is the virtual character obtaining interface, the game screen 306 includes an interaction object 308, and the interaction object 308 is the virtual interaction object for obtaining the first virtual character.

In a possible implementation, in this embodiment of this application, the virtual interaction object may include many types of shapes, for example, may include, but not limited to, being displayed as a virtual circular region, a virtual rectangular region, and a virtual triangular region, which can allow configuration as a plurality of interaction regions.

The virtual interaction object includes a plurality of interaction regions, and the plurality of interaction regions may be the same or different in area, and may be flexibly configured according to actual requirements. A smaller interaction region may be configured corresponding to a more precious virtual biological attribute, and a larger interaction region may be configured corresponding to a more general virtual biological attribute.

In a possible implementation, in this embodiment of this application, that each interaction region corresponds to a virtual biological attribute, and a plurality of interaction regions correspond to a plurality of virtual biological attributes may be understood as that each interaction region corresponds to one virtual biological attribute, or may include, but not limited to, that some interaction regions correspond to the same virtual biological attribute, and the remaining interaction regions correspond to another virtual biological attribute different from the former, but at least two different virtual biological attributes are included.

In a possible implementation, the virtual biological attribute may include many attribute types, for example, may include, but not limited to, a time attribute, a regional attribute, a compositional element attribute, and a food attribute. The plurality of interaction regions correspond to one type of virtual biological attributes, and each of the plurality of interaction regions corresponds to one virtual biological attribute of the type of virtual biological attributes.

For example, using an example in which the type of virtual biological attributes is the time attribute, the plurality of virtual biological attributes may include, but are not limited to, daytime and nighttime, or spring, summer, autumn, and winter.

Figure 4:
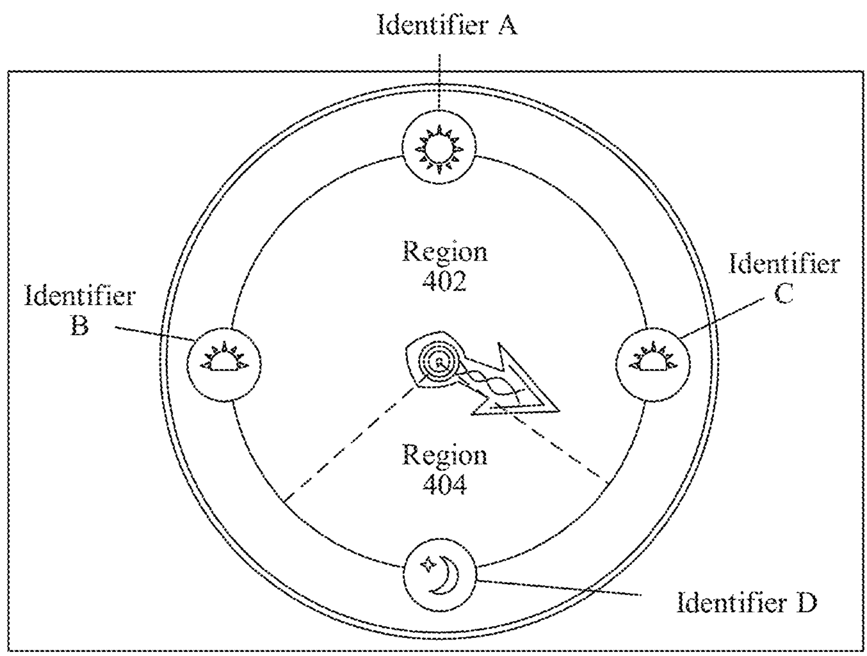
FIG. 4 is a schematic diagram of another exemplary virtual character obtaining method according to an embodiment of this application.

For example, FIG. 4 is a schematic diagram of another exemplary virtual character obtaining method according to an embodiment of this application. Using an example in which the plurality of virtual biological attributes include daytime and nighttime, the virtual interaction object may include, but is not limited to, being displayed in the following manners.

In FIG. 4, an upper identifier A, a left identifier B, and a right identifier C represent that the corresponding virtual biological attribute is daytime, and a lower identifier D represents that the corresponding virtual biological attribute is nighttime. In this case, a region 402 formed by the identifier A, the identifier B, and the identifier C is one of the plurality of interaction regions, and a region 404 corresponding to the identifier D is another of the plurality of interaction regions.

Figure 5:
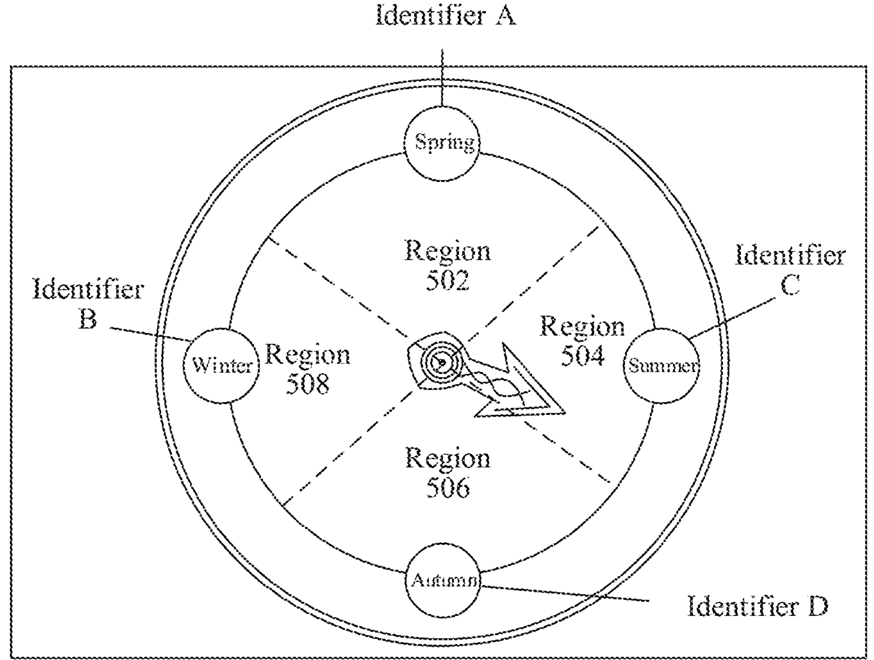
FIG. 5 is a schematic diagram of another exemplary virtual character obtaining method according to an embodiment of this application.

For another example, FIG. 5 is a schematic diagram of still another exemplary virtual character obtaining method according to an embodiment of this application. Using an example in which different virtual biological attributes include spring, summer, autumn, and winter, the virtual interaction object may include, but is not limited to, being displayed in the following manners.

In FIG. 5, an upper identifier A represents that the corresponding virtual biological attribute is spring, a right identifier C represents that the corresponding virtual biological attribute is summer, a lower identifier D represents that the corresponding virtual biological attribute is autumn, and a left identifier B represents that the corresponding virtual biological attribute is winter. In this case, the identifier A, the identifier B, the identifier C, and the identifier D correspond to a region 502, a region 504, a region 506, and a region 508 respectively. Each of the region 502, the region 504, the region 506, and the region 508 is one of the plurality of interaction regions corresponding to different virtual biological attributes.

The foregoing is merely an example and is not specifically limited in this embodiment of this application.

In a possible implementation, in this embodiment of this application, the target interaction manner is an interaction manner corresponding to the attribute types of the plurality of virtual biological attributes. Using an example in which the attribute type of the virtual biological attribute is the time attribute, the virtual interaction object may be configured as a clock mode. In this case, the target interaction manner may be rotating an hour pointer of a clock to implement the selection operation performed on the first interaction region of the plurality of interaction regions. Using an example in which the attribute type of the virtual biological attribute is the compositional element attribute, the virtual interaction object may be configured as a mode in which an element floats, and the selection operation performed on the first interaction region of the plurality of interaction regions is implemented by grabbing the floating element on the virtual interaction object.

Figure 6:
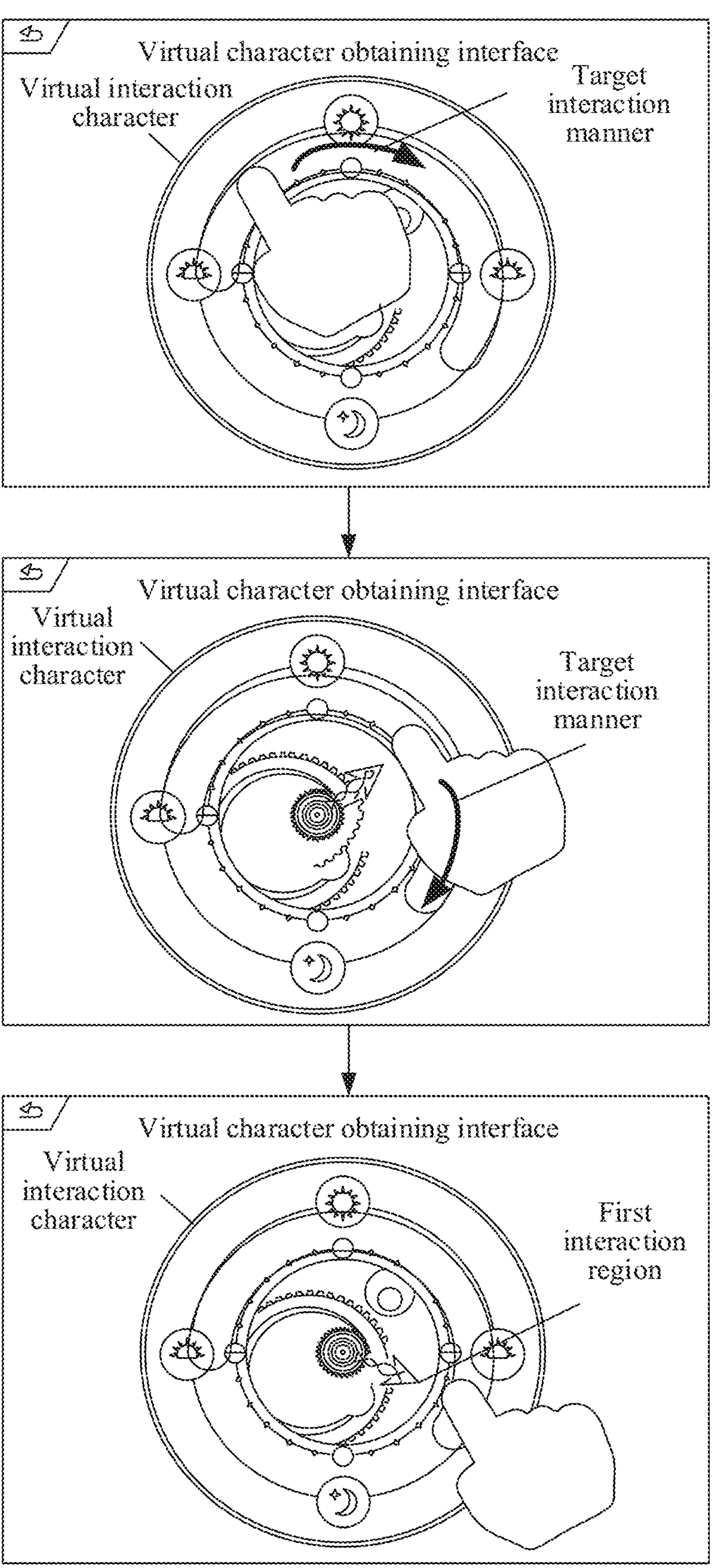
FIG. 6 is a schematic diagram of another exemplary virtual character obtaining method according to an embodiment of this application.

For example, FIG. 6 is a schematic diagram of still another exemplary virtual character obtaining method according to an embodiment of this application. Using an example in which the attribute type of the virtual biological attribute is the time attribute and the plurality of virtual biological attributes include daytime and nighttime, the target interaction manner may include, but is not limited to, being implemented in the following manners.

As shown in FIG. 6, an upper identifier, a left identifier, and a right identifier represent that the corresponding virtual biological attribute is daytime, and a lower identifier represents that the corresponding virtual biological attribute is nighttime. In this case, a wheel pointer is rotated to a lower right corner in a clockwise direction by dragging, and an interaction region indicated by the wheel pointer is the first interaction region. In this case, it represents that the first virtual biological attribute of the currently obtained virtual character is a nighttime virtual biological attribute.

In a possible implementation, in this embodiment of this application, the selection operation is configured for representing that the first interaction region is selected, or may be understood as that the first virtual biological attribute corresponding to the first interaction region is selected, to obtain the first virtual character having the first virtual biological attribute.

In a possible implementation, in this embodiment of this application, the virtual biological attributes of the virtual characters in the target virtual character set are all first virtual biological attributes. When only one virtual character exists in the target virtual character set, the virtual character is the first virtual character, and when a plurality of virtual characters exist in the target virtual character set, one virtual character is randomly selected from the target virtual character set as the first virtual character.

The selection operation actually selects the target virtual character set, and when the target virtual character set includes a plurality of virtual characters, the first virtual character may further be determined randomly or according to the quantity of virtual resources held by the current account. Therefore, on the basis of allowing a user to affect a result of obtaining the virtual character, interestingness of the virtual character obtaining process can further be improved, further optimizing user experience, and improving efficiency of obtaining the virtual character by the user.

According to this embodiment, the virtual interaction object for obtaining the virtual character is displayed in the virtual character obtaining interface, where the virtual interaction object includes the plurality of interaction regions, each interaction region corresponds to the virtual biological attribute, and the plurality of interaction regions correspond to the plurality of virtual biological attributes; the selection operation on the first interaction region of the plurality of interaction regions according to the target interaction manner is obtained, where the virtual biological attribute corresponding to the first interaction region is the first virtual biological attribute, and the target interaction manner corresponds to the attribute types of the plurality of virtual biological attributes; and the first virtual character is obtained in the target virtual character set in response to the selection operation on the first interaction region and the obtained first virtual character is displayed, where the virtual biological attribute of the virtual character in the target virtual character set is the first virtual biological attribute. The first virtual character in the target virtual character set can be obtained by configuring different interaction regions corresponding to different virtual biological attributes for the virtual interaction object and selecting the first interaction region by using the target interaction manner corresponding to the virtual biological attribute. The interaction regions selected by different users may be different, thereby allowing differential behaviors of the users to affect the obtained virtual character, thereby achieving the technical effects of optimizing the user experience, improving obtaining efficiency of the virtual character, and enabling the user to affect the result of obtaining the virtual character, so that the technical problem in the related art that the result of obtaining the virtual character is difficult to control and the obtaining efficiency of the virtual character is low is resolved.

In a possible implementation, the obtaining a first virtual character in a target virtual character set in response to the selection operation on the first interaction region includes:

obtaining the first virtual character in the target virtual character set in response to the selection operation on the first interaction region if the plurality of virtual biological attributes are different time attributes, where the first virtual biological attribute is a first time attribute, the different time attributes represent different time periods, the first time attribute represents a first time period, and the virtual character of which the virtual biological attribute is the first time attribute includes at least one of the following: a virtual character obtained by being allowed to evolve within the first time period and a virtual character allowed to be used within the first time period.

In a possible implementation, in this embodiment of this application, that the first virtual biological attribute is a first time attribute may be understood as that the first interaction region is configured to be associated with a first virtual character having the first time attribute, and when the first interaction region is selected by the selection operation in the target interaction manner, the first virtual character in the target virtual character set starts to be obtained.

In a possible implementation, in this embodiment of this application, that the different time attributes represent different time periods may be understood as different time periods formed by daytime and nighttime, or may be understood as different time periods formed by spring, summer, autumn, and winter.

In a possible implementation, in this embodiment of this application, that the virtual character of which the virtual biological attribute is the first time attribute includes a virtual character obtained by being allowed to evolve within the first time period may be understood as that the virtual character in the target virtual character set may be obtained through evolution within the first time period.

For example, a virtual character A may evolve during daytime to obtain a virtual character B, or may evolve during nighttime to obtain a virtual character C. In this case, when the first interaction region is selected by the selection operation in the target interaction manner, and the virtual biological attribute corresponding to the first interaction region is daytime, the virtual character B is obtained, and when the first interaction region is selected by the selection operation in the target interaction manner, and the virtual biological attribute corresponding to the first interaction region is nighttime, the virtual character C is obtained.

In a possible implementation, in this embodiment of this application, that the virtual character of which the virtual biological attribute is the first time attribute includes a virtual character allowed to be used within the first time period may be understood as that the virtual character in the target virtual character set may be used within the first time period.

For example, the virtual character B may be used during daytime and the virtual character C may be used during nighttime. In this case, when the first interaction region is selected by the selection operation in the target interaction manner and the virtual biological attribute corresponding to the first interaction region is daytime, the virtual character B is obtained, and when the first interaction region is selected by the selection operation in the target interaction manner and the virtual biological attribute corresponding to the first interaction region is nighttime, the virtual character C is obtained.

The foregoing is merely an example and is not specifically limited in this embodiment of this application.

In a possible implementation, the obtaining a first virtual character in a target virtual character set in response to the selection operation on the first interaction region includes:

obtaining the first virtual character in the target virtual character set in response to an interaction operation on the first interaction region if the plurality of virtual biological attributes are different regional attributes, where the first virtual biological attribute is a first regional attribute, the different regional attributes represent different regions, the first regional attribute represents a first region, and the virtual character of which the virtual biological attribute is the first regional attribute includes at least one of the following: a virtual character obtained by being allowed to evolve in the first region and a virtual character allowed to be used in the first region.

In a possible implementation, in this embodiment of this application, that the first virtual biological attribute is a first regional attribute may be understood as that the first interaction region is configured to be associated with a first virtual character having the first regional attribute, and when the first interaction region is selected by the selection operation in the target interaction manner, the first virtual character in the target virtual character set starts to be obtained.

In a possible implementation, in this embodiment of this application, the different regions represented by the different regional attributes may be understood as different regions formed by land and sea, or may be understood as different regions formed by cast, south, west, and north.

In a possible implementation, in this embodiment of this application, that the virtual character of which the virtual biological attribute is the first regional attribute includes a virtual character obtained by being allowed to evolve in the first region may be understood as that the virtual character in the target virtual character set may be obtained through evolution in the first region.

For example, a virtual character A may evolve in a land region to obtain a virtual character B, and may evolve in a sea region to obtain a virtual character C. In this case, when the first interaction region is selected by the selection operation in the target interaction manner, and the virtual biological attribute corresponding to the first interaction region is the land region, the virtual character B is obtained, and when the first interaction region is selected by the selection operation in the target interaction manner, and the virtual biological attribute corresponding to the first interaction region is the sea region, the virtual character C is obtained.

In a possible implementation, in this embodiment of this application, that the virtual character of which the virtual biological attribute is the first regional attribute includes a virtual character allowed to be used in the first region may be understood as that the virtual character in the target virtual character set may be used in the first region.

For example, the virtual character B may be used in the land region and the virtual character C may be used in the sea region. In this case, when the first interaction region is selected by the selection operation in the target interaction manner and the virtual biological attribute corresponding to the first interaction region is the land region, the virtual character B is obtained, and when the first interaction region is selected by the selection operation in the target interaction manner and the virtual biological attribute corresponding to the first interaction region is the sea region, the virtual character C is obtained.

The foregoing is merely an example and is not specifically limited in this embodiment of this application.

In a possible implementation, the obtaining a first virtual character in a target virtual character set in response to the selection operation on the first interaction region includes:

obtaining the first virtual character in the target virtual character set in response to the selection operation on the first interaction region if the plurality of virtual biological attributes are different time attributes and different regional attributes, where the first virtual biological attribute includes a first time attribute and a first regional attribute, the different time attributes represent different time periods, the first time attribute represents a first time period, the different regional attributes represent different regions, and the first regional attribute represents a first region, where the virtual character of which the virtual biological attribute is the first time attribute and the first regional attribute includes at least one of the following:

a virtual character obtained by being allowed to evolve in the first region within the first time period;

a virtual character obtained by being allowed to evolve within the first time period and allowed to be used in the first region;

a virtual character allowed to be used within the first time period and obtained by being allowed to evolve in the first region; and a virtual character allowed to be used in the first region within the first time period.

In a possible implementation, in this embodiment of this application, that the first virtual biological attribute includes a first time attribute and a first regional attribute may be understood as that the first interaction region is configured to be associated with a first virtual character having the first time attribute and the first regional attribute, and when the first interaction region is selected by the selection operation in the target interaction manner, the first virtual character in the target virtual character set starts to be obtained.

In a possible implementation, in this embodiment of this application, the different time periods represented by the different time attributes may be understood as different time periods formed by daytime and nighttime, or may be understood as different time periods formed by spring, summer, autumn, and winter, and the different regions represented by the different regional attributes may be understood as different regions formed by land and sea, or may be understood as different regions formed by cast, south, west, and north.

In a possible implementation, in this embodiment of this application, that the virtual character of which the virtual biological attribute is the first time attribute and the first regional attribute includes a virtual character obtained by being allowed to evolve in the first region within the first time period may be understood as that the virtual character in the target virtual character set may be obtained through evolution in the first region within the first time period.

For example, the virtual character A may evolve on land during daytime to obtain the virtual character B, or may evolve on sea during nighttime to obtain the virtual character C. In this case, when the first interaction region is selected by the selection operation in the target interaction manner, and the virtual biological attributes corresponding to the first interaction region are daytime and land, the virtual character A evolves to obtain the virtual character B, and when the first interaction region is selected by the selection operation in the target interaction manner, and the virtual biological attributes corresponding to the first interaction region are nighttime and sea, the virtual character A evolves to obtain the virtual character C.

In a possible implementation, in this embodiment of this application, that the virtual character of which the virtual biological attribute is the first time attribute and the first regional attribute includes a virtual character obtained by being allowed to evolve within the first time period and allowed to be used in the first region may be understood as that the virtual character in the target virtual character set may be obtained through evolution within the first time period and allowed to be used in the first region.

For example, the virtual character A may evolve during daytime to obtain the virtual character B, and the virtual character B may be used on land, or the virtual character A may evolve during nighttime to obtain the virtual character C, and the virtual character C may be used in sea. In this case, when the first interaction region is selected by the selection operation in the target interaction manner, and the virtual biological attributes corresponding to the first interaction region are daytime and land, the virtual character B may be obtained, and when the first interaction region is selected by the selection operation in the target interaction manner, and the virtual biological attributes corresponding to the first interaction region are nighttime and sea, the virtual character C is obtained.

In a possible implementation, in this embodiment of this application, that the virtual character of which the virtual biological attribute is the first time attribute and the first regional attribute includes a virtual character allowed to be used within the first time period and obtained by being allowed to evolve in the first region may be understood as that the virtual character in the target virtual character set may be used within the first time period and allowed to be obtained through evolution in the first region.

For example, the virtual character A may evolve on land to obtain the virtual character B, and the virtual character B may be used during daytime, or the virtual character A may evolve in sea to obtain the virtual character C, and the virtual character C may be used during nighttime. In this case, when the first interaction region is selected by the selection operation in the target interaction manner, and the virtual biological attributes corresponding to the first interaction region are land and daytime, the virtual character B may be obtained, and when the first interaction region is selected by the selection operation in the target interaction manner, and the virtual biological attributes corresponding to the first interaction region are sea and nighttime, the virtual character C is obtained.

In a possible implementation, in this embodiment of this application, that the virtual character of which the virtual biological attribute is the first time attribute and the first regional attribute includes a virtual character allowed to be used in the first region within the first time period may be understood as that the virtual character in the target virtual character set may be used in the first region within the first time period.

For example, the virtual character B may be used on land during daytime and the virtual character C may be used in sea during nighttime. In this case, when the first interaction region is selected by the selection operation in the target interaction manner and the virtual biological attributes corresponding to the first interaction region are daytime and land, the virtual character B is obtained, and when the first interaction region is selected by the selection operation in the target interaction manner and the virtual biological attributes corresponding to the first interaction region are nighttime and sea, the virtual character C is obtained.

In a possible implementation, in this embodiment of this application, that the virtual character of which the virtual biological attribute is the first regional attribute includes a virtual character obtained by being allowed to evolve in the first region may be understood as that the virtual character in the target virtual character set may be obtained through evolution in the first region. For example, the virtual character A may evolve in a land region to obtain the virtual character B, or may evolve in a sea region to obtain the virtual character C. In this case, when the first interaction region is selected by the selection operation in the target interaction manner, and the virtual biological attribute corresponding to the first interaction region is the land region, the virtual character A evolves to obtain the virtual character B, and when the first interaction region is selected by the selection operation in the target interaction manner, and the virtual biological attribute corresponding to the first interaction region is the sea region, the virtual character A evolves to obtain the virtual character C.

In a possible implementation, in this embodiment of this application, that the virtual character of which the virtual biological attribute is the first regional attribute includes a virtual character allowed to be used in the first region may be understood as that the virtual character in the target virtual character set may be used in the first region. For example, the virtual character B may be used in the land region and the virtual character C may be used in the sea region. In this case, when the first interaction region is selected by the selection operation in the target interaction manner and the virtual biological attribute corresponding to the first interaction region is the land region, the virtual character B is obtained, and when the first interaction region is selected by the selection operation in the target interaction manner and the virtual biological attribute corresponding to the first interaction region is the sea region, the virtual character C is obtained.

The foregoing is merely an example and is not specifically limited in this embodiment of this application.

According to this embodiment, by configuring corresponding different time attributes and regional attributes for different interaction regions, a behavior and a result of obtaining the virtual character by the user are closer to world view settings of the application scenario, and the process of obtaining the virtual character is associated with the time attribute and the map attribute, so that association between the virtual character biological attribute and the virtual character is enhanced, the freedom degree of the user on the process of obtaining the virtual character is optimized, and the efficiency and the accuracy of obtaining the virtual character by the user are further improved.

In this embodiment of this application, the virtual interaction object may have different forms, and when the forms of the virtual interaction object are different, a manner in which the virtual interaction object for obtaining the virtual character is displayed in the virtual character obtaining interface may be different, and the corresponding selection operation may be different. In a possible implementation, the virtual interaction object may be a virtual wheel. In this case, the displaying a virtual interaction object for obtaining a virtual character in a virtual character obtaining interface includes: displaying the virtual wheel configured for obtaining the virtual character in the virtual character obtaining interface, where the virtual wheel includes the plurality of interaction regions and a virtual wheel pointer, and the virtual wheel pointer is set to be allowed to rotate in the plurality of interaction regions; and the obtaining a selection operation on a first interaction region of the plurality of interaction regions according to a target interaction manner includes: determining the target interaction manner as a rotation operation according to the virtual biological attributes corresponding to the plurality of interaction regions in the virtual wheel, and obtaining a rotation operation performed on the virtual wheel pointer to stop the virtual wheel pointer in the first interaction region.

In a possible implementation, in this embodiment of this application, the virtual wheel may include, but is not limited to, a virtual wheel determined according to a virtual biological attribute, that is, each of the plurality of interaction regions configured in the virtual wheel corresponds to a virtual biological attribute.

Figure 7:
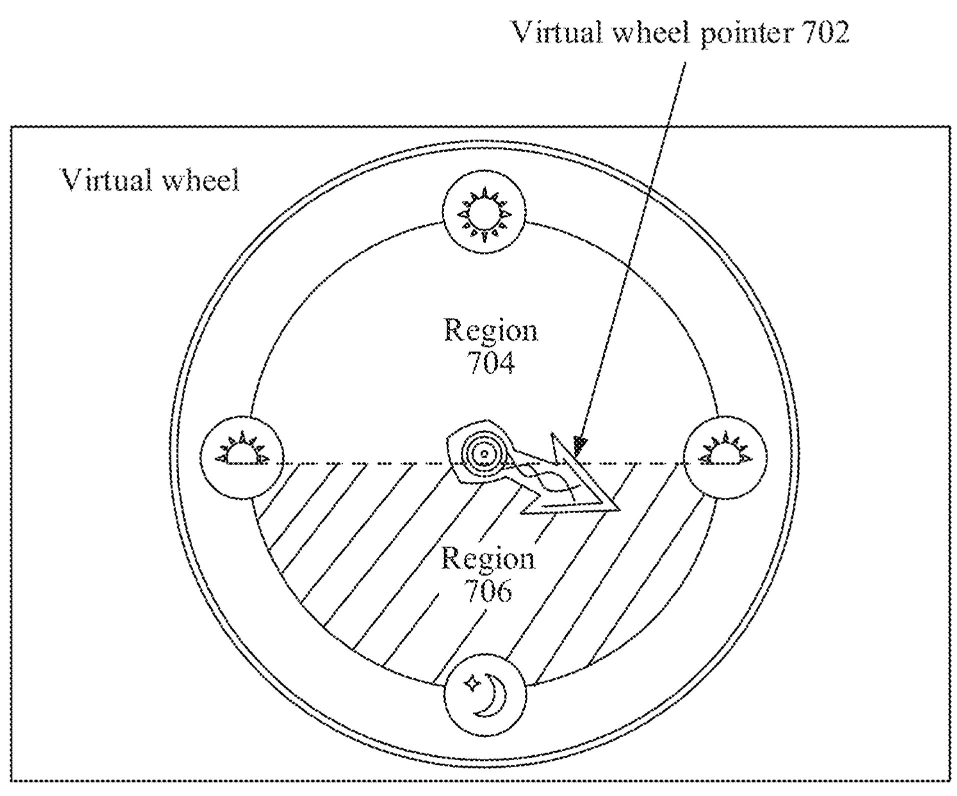
FIG. 7 is a schematic diagram of another exemplary virtual character obtaining method according to an embodiment of this application.

For example, FIG. 7 is a schematic diagram of still another exemplary virtual character obtaining method according to an embodiment of this application. As shown in FIG. 7, the virtual wheel includes a virtual wheel pointer 702, an interaction region 704, and an interaction region 706. The virtual wheel pointer 702 is configured to rotate clockwise within the virtual wheel, the interaction region 704 corresponds to a virtual biological attribute, and the interaction region 706 corresponds to a virtual biological attribute. When the virtual wheel pointer rotates to stay in the interaction region 706, the interaction region 706 is the first interaction region, that is, the target virtual character set includes a virtual character having the first virtual biological attribute corresponding to the first interaction region.

When the virtual interaction object is a virtual wheel, the obtaining a rotation operation performed on the virtual wheel pointer to stop the virtual wheel pointer in the first interaction region includes:

obtaining the rotation operation performed on the virtual wheel pointer, where the rotation operation is configured for controlling the virtual wheel pointer to rotate in a clockwise or counterclockwise direction;

displaying a first display special effect when the virtual wheel pointer rotates to the first interaction region during rotation of the virtual wheel pointer, where the first display special effect corresponds to the first interaction region, and the first display special effect is configured for indicating the first virtual biological attribute;

displaying a second display special effect when the virtual wheel pointer rotates to a second interaction region during the rotation of the virtual wheel pointer, where the second interaction region is configured for obtaining a second virtual character, the second virtual character corresponds to a second virtual biological attribute, the second display special effect is configured for indicating the second virtual biological attribute, and the second virtual biological attribute is different from the first virtual biological attribute; and displaying a third display special effect when the virtual wheel pointer stops in the first interaction region, where the third display special effect is configured for indicating that a virtual biological attribute of a currently obtained virtual character is the first virtual biological attribute.

In a possible implementation, in this embodiment of this application, the rotation operation performed on the virtual wheel may include, but is not limited to, being implemented by touching a direction button, rotating a joystick, or the like.

Figure 8:
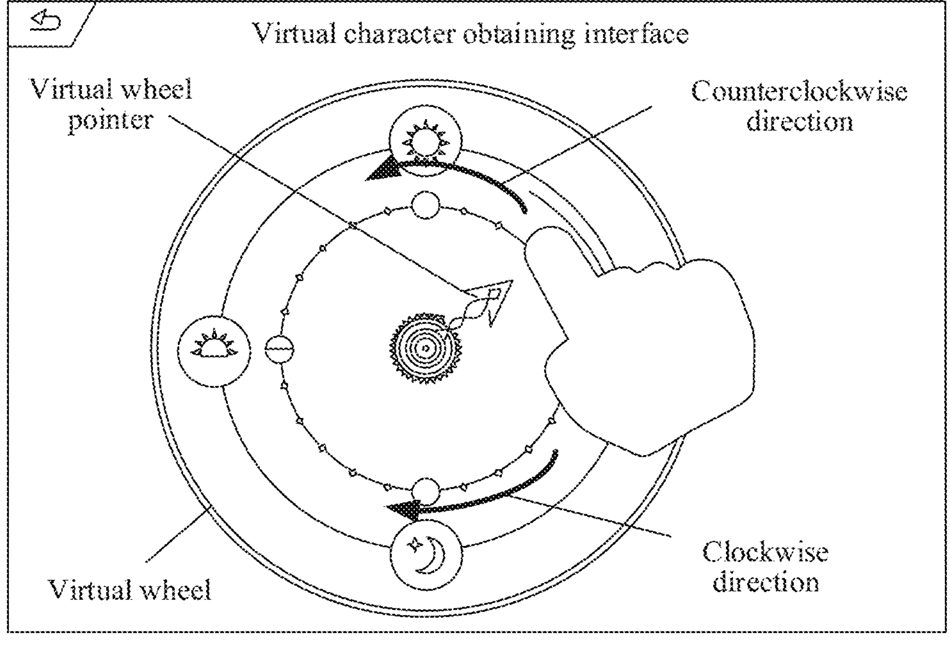
FIG. 8 is a schematic diagram of another exemplary virtual character obtaining method according to an embodiment of this application.

For example, FIG. 8 is a schematic diagram of still another exemplary virtual character obtaining method according to an embodiment of this application. As shown in FIG. 8, the virtual wheel includes a virtual wheel pointer, and when a rotation operation is obtained, the virtual wheel pointer is controlled to rotate in a clockwise direction or a counterclockwise direction.

In a possible implementation, in this embodiment of this application, the first display special effect may be understood as a special effect displayed when the virtual wheel pointer passes through the first interaction region before stopping rotating, and the special effect is configured for indicating the first virtual biological attribute.

For example, when the first virtual biological attribute represents daytime, the first display special effect may be white light to represent that the current virtual wheel pointer is passing through the first interaction region.

In a possible implementation, in this embodiment of this application, the second display special effect may be understood as a special effect displayed when the virtual wheel pointer passes through the second interaction region before stopping rotating, and the special effect is configured for indicating the second virtual biological attribute. When the virtual wheel pointer stops in the second interaction region, the virtual characters in the target virtual character set are all virtual characters having the second virtual biological attribute.

For example, when the second virtual biological attribute represents nighttime, the first display special effect may be black light to represent that the current virtual wheel pointer is passing through the second interaction region.

In a possible implementation, in this embodiment of this application, the displaying a third display special effect when the virtual wheel pointer stops in the first interaction region may be understood as indicating that the virtual biological attribute of the currently obtained virtual character is the first virtual biological attribute, that is, a relevant special effect of the virtual character having the first virtual biological attribute may be displayed to represent the first virtual character to be obtained.

Since there may be a variety of attribute types of the virtual biological attribute, when the attribute types of the plurality of virtual biological attributes corresponding to the plurality of interaction regions are different, the type of the virtual wheel may also be different, thereby causing the virtual wheel pointer to stop in the first interaction region in a slightly different manner. In a possible implementation, the determining the target interaction manner as a rotation operation according to the virtual biological attributes corresponding to the plurality of interaction regions in the virtual wheel, and obtaining a rotation operation performed on the virtual wheel pointer to stop the virtual wheel pointer in the first interaction region includes:

- when the plurality of virtual biological attributes represent different time attributes, the virtual wheel being a virtual clock wheel, determining the rotation operation as a clock rotation operation, and obtaining a clock rotation operation performed on a virtual clock wheel pointer to stop the virtual clock wheel pointer in the first interaction region, where the virtual wheel includes the virtual clock wheel; or
- when the plurality of virtual biological attributes represent different regional attributes, determining the rotation operation as a map rotation operation, and obtaining a map rotation operation performed on a virtual map wheel pointer to stop the virtual map wheel pointer in the first interaction region, where the virtual wheel includes the virtual map wheel.

In a possible implementation, in this embodiment of this application, the virtual clock wheel may be a clock wheel determined according to the virtual biological attribute. When the virtual biological attribute includes daytime and nighttime, the clock wheel may include two scales of daytime and nighttime, and when the virtual biological attribute includes spring, summer, autumn, and winter, the clock wheel may include four scales of spring, summer, autumn, and winter.

In a possible implementation, in this embodiment of this application, the virtual map wheel may be a map wheel determined according to the virtual biological attribute. When the virtual biological attribute includes a world map, the map wheel may include a plurality of scales divided by longitude, and when the virtual biological attribute includes a map preset by a system, the map wheel may include a plurality of preset scales.

Figure 9:
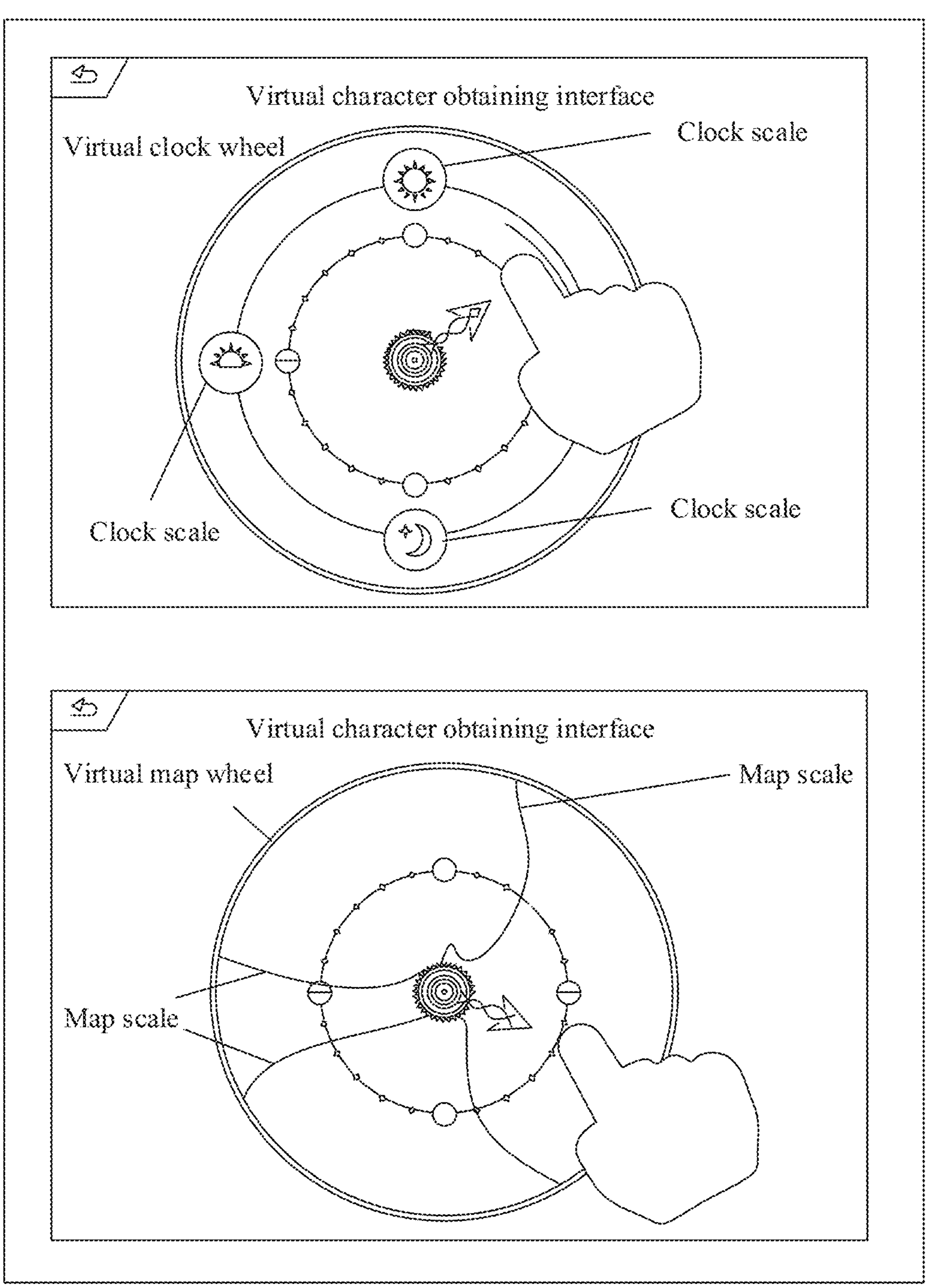
FIG. 9 is a schematic diagram of another exemplary virtual character obtaining method according to an embodiment of this application.

FIG. 9 is a schematic diagram of still another exemplary virtual character obtaining method according to an embodiment of this application. As shown in FIG. 9, a region between every two clock scales or every two map scales is an interaction region of the plurality of interaction regions.

The foregoing is merely an example and is not specifically limited in this embodiment of this application.

The display of the virtual interaction object for obtaining the virtual character in the virtual character obtaining interface may be triggered in various manners, for example, may be triggered after the account completes the preset task, or may be triggered when the virtual resource carried by the account meets a preset condition. If the display of the virtual interaction object for obtaining the virtual character in the virtual character obtaining interface is triggered after the account completes the preset task, the displaying a virtual interaction object for obtaining a virtual character in a virtual character obtaining interface includes:

- when the preset task is completed, displaying the virtual interaction object in the virtual character obtaining interface according to a task attribute of the preset task, where there is a correspondence between the task attribute of the preset task and the attribute type, and the task attribute is configured for representing a completion result of the preset task or a task type of the preset task.

In a possible implementation, in this embodiment of this application, the preset task may be configured as a task of obtaining a current account of the virtual character, and the preset task may be performed by the current account independently, or by the current account together with other accounts in the same camp as the current account.

In a possible implementation, in this embodiment of this application, that there is a correspondence between the task attribute of the preset task and the attribute type may be understood as that the task attribute is an attribute associated with the attribute type. For example, when the attribute type of the virtual biological attribute is a time attribute, the task attribute may be configured as a task-related time attribute, for example, a duration of the task or a completion moment of the task.

In a possible implementation, in this embodiment of this application, the completion result of the preset task may include, but is not limited to, a completion progress of the preset task, a completion level of the preset task, or the like, and the task type of the preset task may include, but is not limited to, a virtual biological attribute indicated by the preset task, a target virtual character set, or the like.

In a possible implementation, the displaying the virtual interaction object in the virtual character obtaining interface according to a task attribute of the preset task includes:

- displaying the virtual interaction object in the virtual character obtaining interface when the completion result of the preset task represents a first completion degree if the task attribute is configured for representing the completion result of the preset task, where the plurality of virtual biological attributes include different virtual biological attributes belonging to a first attribute type; and displaying the virtual interaction object in the virtual character obtaining interface when the completion result of the preset task represents a second completion degree if the task attribute is configured for representing the completion result of the preset task, where the plurality of virtual biological attributes include different virtual biological attributes belonging to a second attribute type, where the first completion degree is different from the second completion degree, and the first attribute type is different from the second attribute type.

In a possible implementation, in this embodiment of this application, the plurality of preset completion degrees may include, but are not limited to, a plurality of completion degrees preset by the system, where each completion degree corresponds to one type of virtual biological attributes, and the completion degree may include, but is not limited to, a quantity of obtained virtual resources, a duration of the preset task, or the like.

Figure 10:
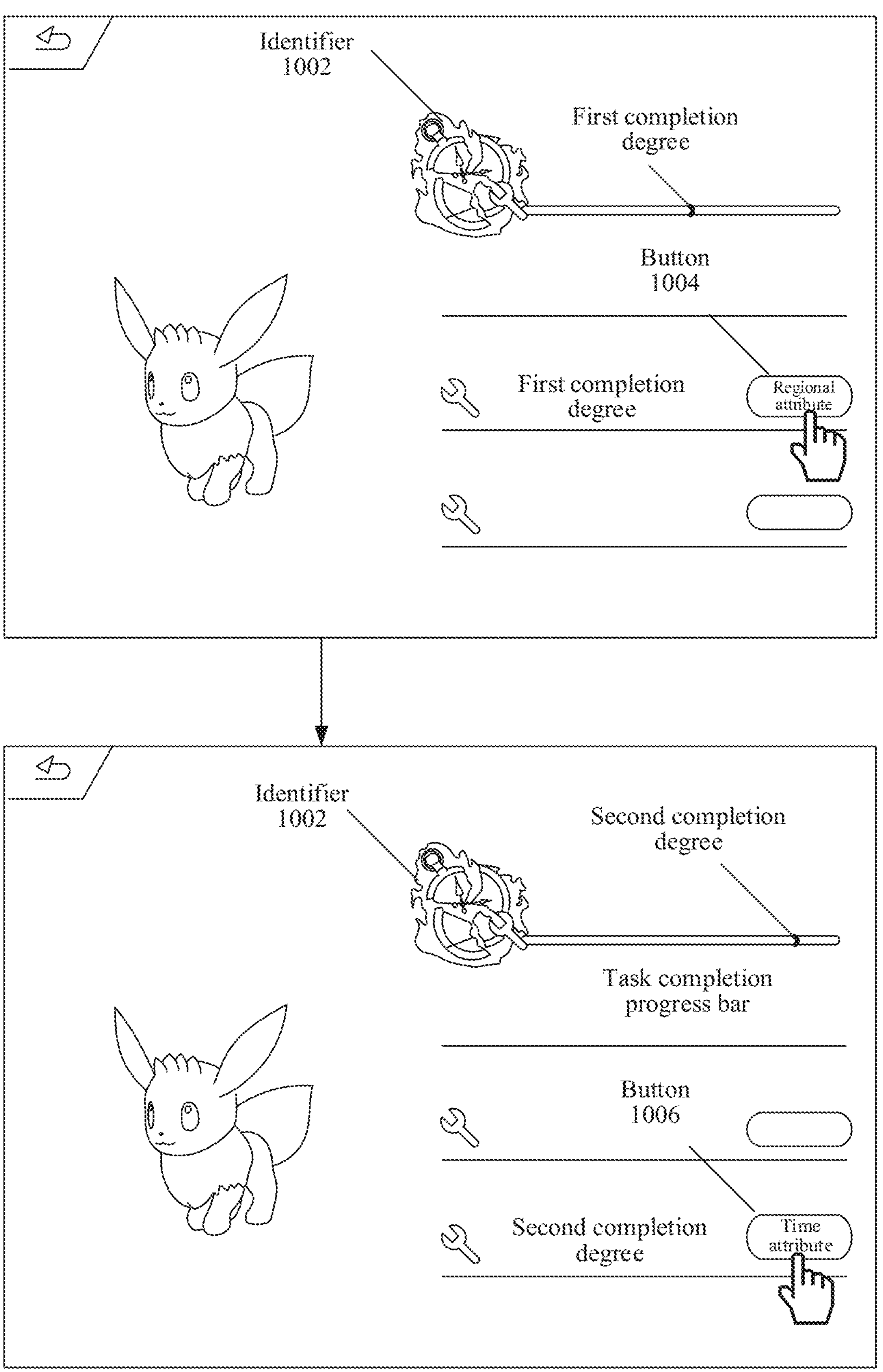
FIG. 10 is a schematic diagram of another exemplary virtual character obtaining method according to an embodiment of this application.

For example, FIG. 10 is a schematic diagram of still another exemplary virtual character obtaining method according to an embodiment of this application. As shown in FIG. 10, after the current account accepts the preset task, an identifier 1002 of the preset task and a task completion progress bar are displayed on a game screen. When the preset task is configured to obtain a virtual resource meeting a preset condition, as the virtual resource is obtained by the current account, the task completion progress bar is continuously updated, and when the quantity of virtual resources corresponding to the first completion degree is obtained, a button 1004 for triggering the display of the virtual interaction object is displayed in the game screen. In this case, an interaction operation is performed on the button 1004, to trigger the display of the virtual interaction object, and the plurality of virtual biological attributes include different virtual biological attributes belonging to the regional attribute. When the quantity of virtual resources corresponding to the second completion degree is obtained, a button 1006 for triggering the display of the virtual interaction object is displayed in the game screen. In this case, an interaction operation is performed on the button 1006 to trigger the display of the virtual interaction object, and the plurality of virtual biological attributes include different virtual biological attributes belonging to the time attribute. In this case, the first attribute type may be a regional attribute, and the second attribute type may be a time attribute.

The foregoing is merely an example and is not specifically limited in this embodiment of this application.

In a possible implementation, the displaying the virtual interaction object in the virtual character obtaining interface according to a task attribute of the preset task includes:

displaying the virtual interaction object in the virtual character obtaining interface when the completion result of the preset task represents a first task type if the task attribute is configured for representing the task type of the preset task, where the plurality of virtual biological attributes include different virtual biological attributes belonging to a first attribute type; and displaying the virtual interaction object in the virtual character obtaining interface when the completion result of the preset task represents a second task type if the task attribute is configured for representing the task type of the preset task, where the plurality of virtual biological attributes include different virtual biological attributes belonging to a second attribute type, where the first task type is different from the second task type, and the first attribute type is different from the second attribute type.

In a possible implementation, in this embodiment of this application, the plurality of preset task types may include, but are not limited to, a plurality of task types preset by the system, where each task type corresponds to one type of virtual biological attributes, and the task types may include, but are not limited to, a time-limited task (completed within a preset duration), a running-graph task (controlling a virtual character to move in a game map until all places required by the preset task are traversed), and the like.

Figure 11:
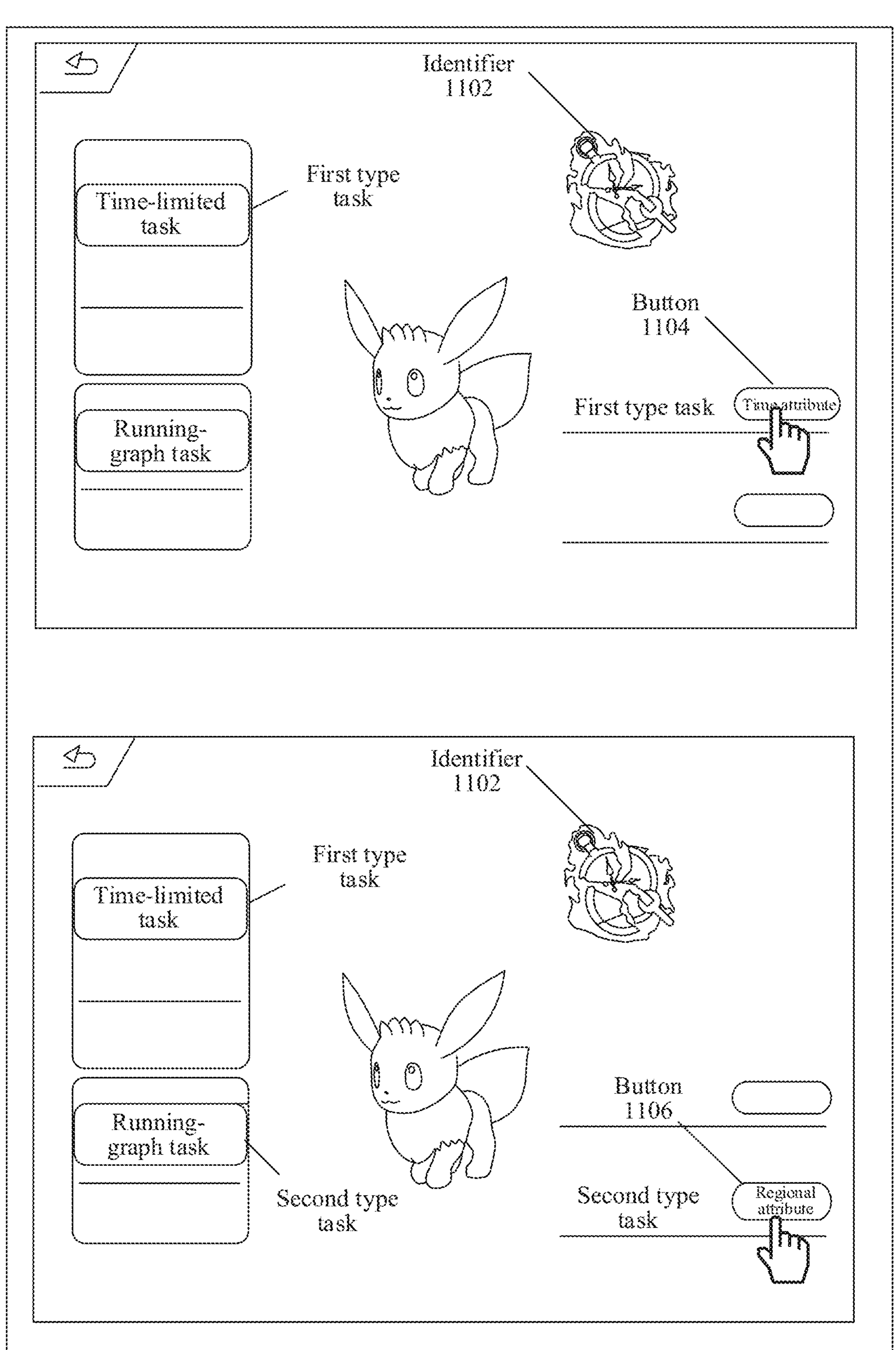
FIG. 11 is a schematic diagram of another exemplary virtual character obtaining method according to an embodiment of this application.

For example, FIG. 11 is a schematic diagram of still another exemplary virtual character obtaining method according to an embodiment of this application. As shown in FIG. 11, after the current account accepts the preset task, an identifier 1102 of the preset task and a task type are displayed on a game screen. When the preset task is configured as a time-limited task, as the current account continuously performs the preset task until a condition of the time-limited task is met, a button 1104 for triggering the display of the virtual interaction object is displayed in the game screen. In this case, an interaction operation is performed on the button 1104 to trigger the display of the virtual interaction object, and the plurality of virtual biological attributes include different virtual biological attributes belonging to the time attribute. When the preset task is configured as a running-graph task, as the current account continuously performs the preset task until a condition of the running-graph task is met, a button 1106 for triggering the display of the virtual interaction object is displayed in the game screen. In this case, an interaction operation is performed on the button 1106 to trigger the display of the virtual interaction object, and the plurality of virtual biological attributes include different virtual biological attributes belonging to the regional attribute. In this case, the first attribute type may be a time attribute, and the second attribute type may be a regional attribute.

The foregoing is merely an example and is not specifically limited in this embodiment of this application.

In a possible implementation, the obtaining a selection operation on a first interaction region of the plurality of interaction regions according to a target interaction manner includes:

obtaining a direction control operation, where the direction control operation is configured for determining the first interaction region; and selecting the first interaction region and obtaining the selection operation on the first interaction region if the direction control operation stays in the first interaction region for more than a preset duration.

In a possible implementation, in this embodiment of this application, the direction control operation may be triggered by a virtual direction button or a virtual joystick, so that the virtual interaction object is continuously adjusted by continuously performing the direction control operation until the first interaction region in the virtual interaction object is selected. The preset duration may be preset by the system, or may be controlled by the current account. For example, using the virtual joystick as an example, when the virtual joystick is moved around, the direction control operation starts to be performed, and when moving the virtual joystick around is stopped, the direction control operation stays in the first interaction region.

In a possible implementation, before the displaying a virtual interaction object for obtaining a virtual character in a virtual character obtaining interface, the method further includes:

obtaining an initial virtual character pre-obtained by a current account;

determining, according to the initial virtual character, a virtual character type that the initial virtual character is allowed to evolve or be used; and determining a virtual interaction object if the virtual character type indicates that at least two virtual character types that the initial virtual character is allowed to evolve or be used are included, where different interaction regions of the virtual interaction object correspond to different virtual character types that the initial virtual character is allowed to evolve or be used, and different virtual character types correspond to different virtual biological attributes on a one-to-one basis.

In a possible implementation, in this embodiment of this application, the initial virtual character may include, but is not limited to, being associated with the preset task, that is, the preset task is configured to be a task associated with the initial virtual character, and the initial virtual character is configured for determining the target virtual character set.

Figure 12:
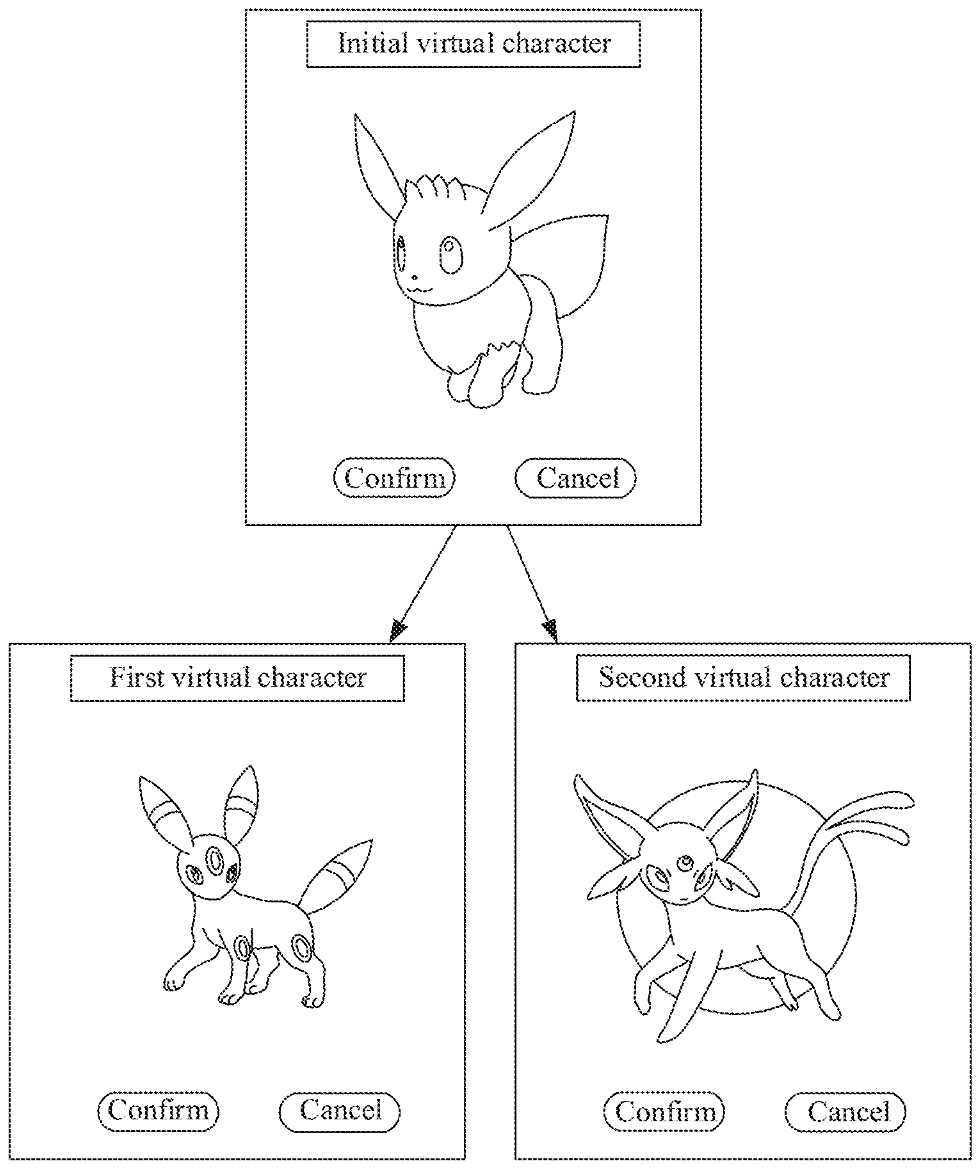
FIG. 12 is a schematic structural diagram of an exemplary virtual character obtaining apparatus according to an embodiment of this application.

For example, FIG. 12 is a schematic diagram of still another exemplary virtual character obtaining method according to an embodiment of this application. As shown in FIG. 12, an initial virtual character is a virtual character pre-obtained by a current account, different interaction regions in the virtual interaction object are configured for evolving the initial virtual character into a first virtual character or a second virtual character, and a type of the first virtual character and a type of the second virtual character are determined according to an evolution chain pre-configured for the initial virtual character.

The foregoing is merely an example and is not specifically limited in this embodiment of this application.

In a possible implementation, the obtaining a direction control operation includes:

obtaining a direction control operation triggered by a virtual joystick when a virtual interaction object is displayed; or obtaining a direction control operation triggered by a virtual direction button when a virtual interaction object is displayed.

In a possible implementation, in this embodiment of this application, the virtual joystick can be rotated clockwise or counterclockwise to control the virtual interaction object to perform the selection operation, and a speed of rotating the virtual joystick may be associated with a magnitude of the direction control operation.

In a possible implementation, in this embodiment of this application, the virtual direction button may be pressed to control the virtual interaction object to perform the selection operation, and a force of pressing the virtual direction button may be associated with the magnitude of the direction control operation.

According to this embodiment of this application, a manner in which the user obtains the virtual character can be optimized, so that the user can perform the direction control operation through the rotation speed or the pressing force, increasing the game play and enriching the user experience.

This application is further described below with reference to specific examples:

A player repairs a broken clock by collecting task points, and after the repair is completed, a dial UI (corresponding to the virtual interaction object) can be exhaled. The dial has clear daytime and nighttime scale marks around, with a unique hour pointer in the middle (in this case, the virtual interaction object is the virtual clock wheel, that is, the dial, the hour pointer is the virtual clock wheel pointer, and a region corresponding to each scale mark is the interaction region). The player can rotate the pointer by a gesture (mobile phone platform)/a joystick (handle). When the hand is released, if the hour pointer points to nighttime, a game character with nighttime biological habits evolves, and if the hour pointer points to daytime, a game character with daytime biological habits is unlocked.

As the player rotates the pointer, when the pointer reaches different regions, the dial has different animations (that is, display special effects) to imply the difference in results.

After the player lifts the hand/loosens the joystick, different character unlocking feedback is given according to the difference in the positions at which the pointer stays: 1. When the pointer stays in an upper region on the dial (daytime), a branch shape that can only evolve during daytime is unlocked; 2. When the pointer stays in a lower region on the dial (nighttime), a branch shape that can only evolve during nighttime is unlocked.

Figure 13:
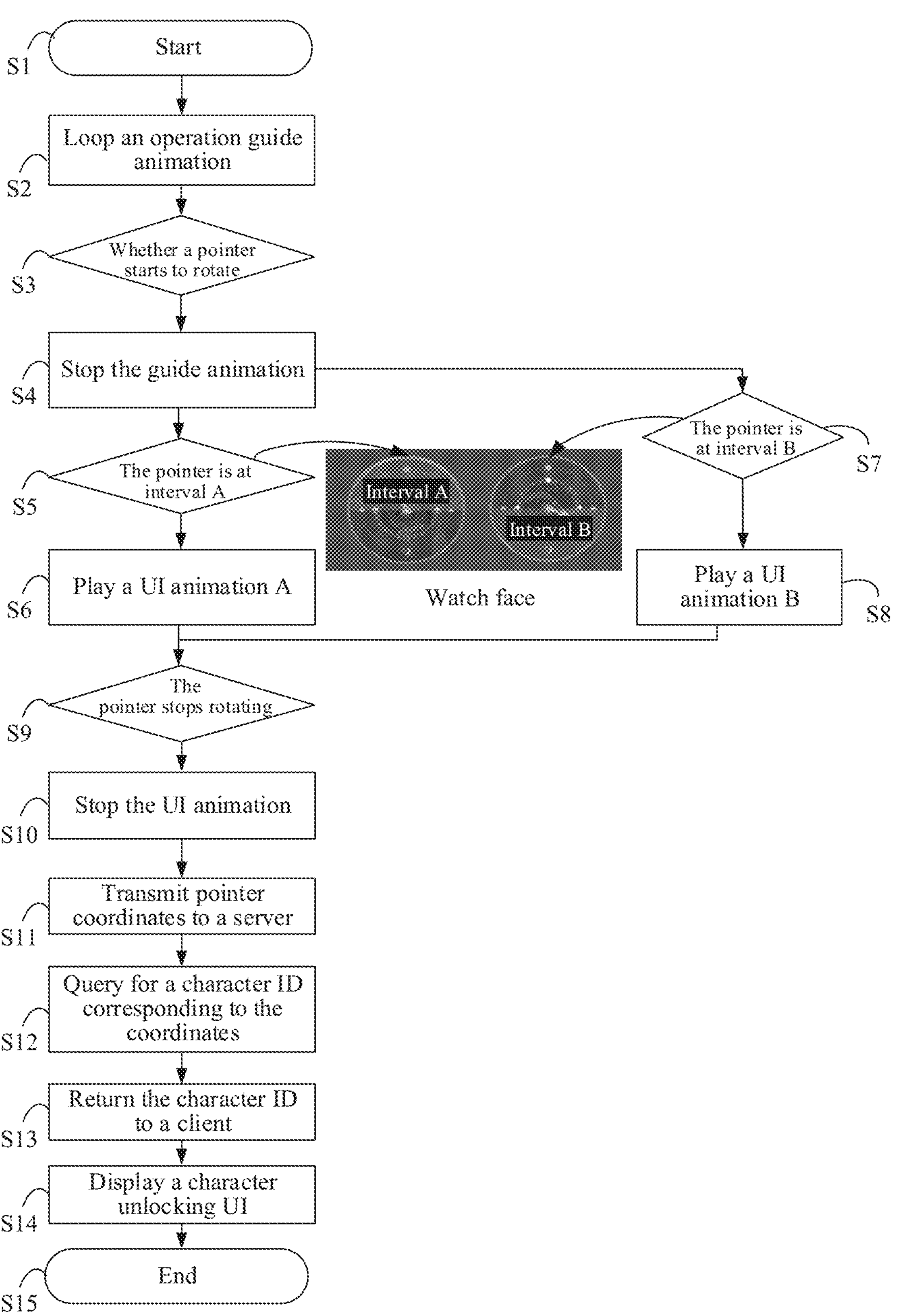
FIG. 13 is a schematic structural diagram of an exemplary virtual character obtaining apparatus according to an embodiment of this application.

FIG. 13 is a schematic diagram of still another exemplary virtual character obtaining method according to an embodiment of this application. The entire flow of this solution is shown in FIG. 13. The flow is initiated by the player operating to turn the pointer, a client gives feedback based on a status of the pointer and transmits data to a backend, and the backend performs authentication and processing of the data and returns the data to the client for corresponding performance. The client may be installed on the terminal device, and the backend may be a server providing a service for the client.

The method specifically includes, but is not limited to, the following operations.

S1: Start.

S2: Loop an operation guide animation.

S3: Determine whether a pointer starts to rotate.

S4: Stop the guide animation.

S5: Determine that the pointer is at an interval A.

S6: Play a UI animation A.

S7: Determine that the pointer is at an interval B.

S8: Play a UI animation B.

S9: Determine whether the pointer stops rotating.

S10: Stop the UI animation.

S11: Transmit pointer coordinates to a server.

S12: Query for a character ID corresponding to the coordinates.

S13: Return the character ID to a client.

S14: Display a character unlocking UI.

S15: End.

The player may be guided to interact with the dial through the animation, the mobile phone platform shows finger swipes, the NX platform shows joystick rotations, and the animation loops until the player begins to rotate the pointer.

The upper region (0-90° and) 270-360° of the dial is the interval A, which represents daytime; and the lower region (90°-270°) of the dial is the interval B, which represents nighttime. When the pointer is at the interval A, the animation A (orange light effect) is played, which implies that a branch shape with a daytime attribute may be evolved; and when the pointer is at the interval B, the animation B (blue light effect) is played, which implies that a branch shape with a nighttime attribute may be evolved.

After the player stops the operation, the client determines the interval to which the pointer belongs based on a pointer angle and uploads the data to the server. The server queries for the character ID corresponding to the interval data and returns the data to the client. The client displays a corresponding character unlocking UI.

According to this embodiment, biological habit characteristics of the game character can be strengthened, and a cognitive depth of the player for the game character can be enhanced, which provides the player with non-paid operating space in a character unlocking dimension, enhances a freedom degree of the player in character selection, enhances a connection sense between the game and the real world, and provides topics, so that the player is more willing to study an unlocking mechanism, interact and communicate with others, and activate social atmosphere.

In a specific implementation of this application, relevant data such as user information is involved. When the foregoing embodiments of this application are applied to specific products or technologies, separate permission or separate consent of the user needs to be obtained, and collection, use, and processing of the relevant data need to comply with relevant laws, regulations, and standards of relevant countries and regions.

For ease of description, the foregoing method embodiments are described as a series of action combinations. However, a person skilled in the art is to learn that this application is not limited to the described order of the actions because some steps may be performed in another order or performed at the same time according to this application. In addition, a person skilled in the art is also to learn that the embodiments described in this specification are all exemplary embodiments, and the involved actions and modules are not necessarily required to this application.

Figure 14:
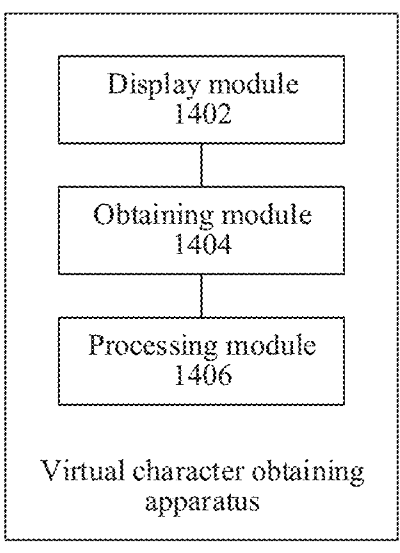
FIG. 14 is a schematic structural diagram of an exemplary virtual character obtaining apparatus according to an embodiment of this application.

According to another aspect of the embodiments of this application, a virtual character obtaining apparatus configured to perform the foregoing virtual character obtaining method is further provided. As shown in FIG. 14, the apparatus includes:

a display module 1402, configured to display a virtual interaction object for obtaining a virtual character in a virtual character obtaining interface, the virtual interaction object including a plurality of interaction regions, each interaction region corresponding to a virtual biological attribute, and the plurality of interaction regions corresponding to a plurality of virtual biological attributes;

an obtaining module 1404, configured to obtain a selection operation on a first interaction region of the plurality of interaction regions according to a target interaction manner, a virtual biological attribute corresponding to the first interaction region being a first virtual biological attribute, and the target interaction manner corresponding to attribute types of the plurality of virtual biological attributes; and a processing module 1406, configured to obtain a first virtual character in a target virtual character set in response to the selection operation on the first interaction region and display the obtained first virtual character, a virtual biological attribute of a virtual character in the target virtual character set being the first virtual biological attribute.

In a possible implementation, the processing module 1406 is configured to obtain the first virtual character in the target virtual character set in response to the selection operation on the first interaction region in the following manners:

obtaining the first virtual character in the target virtual character set in response to the selection operation on the first interaction region if the plurality of virtual biological attributes are different time attributes, where the first virtual biological attribute is a first time attribute, the different time attributes represent different time periods, the first time attribute represents a first time period, and the virtual character of which the virtual biological attribute is the first time attribute includes at least one of the following: a virtual character obtained by being allowed to evolve within the first time period or a virtual character allowed to be used within the first time period.

In a possible implementation, the processing module 1406 is configured to obtain the first virtual character in the target virtual character set in response to the selection operation on the first interaction region in the following manners:

obtaining the first virtual character in the target virtual character set in response to an interaction operation on the first interaction region if the plurality of virtual biological attributes are different regional attributes, where the first virtual biological attribute is a first regional attribute, the different regional attributes represent different regions, the first regional attribute represents a first region, and the virtual character of which the virtual biological attribute is the first regional attribute includes at least one of the following: a virtual character obtained by being allowed to evolve in the first region and a virtual character allowed to be used in the first region.

In a possible implementation, the processing module 1406 is configured to obtain the first virtual character in the target virtual character set in response to the selection operation on the first interaction region in the following manners:

obtaining the first virtual character in the target virtual character set in response to the selection operation on the first interaction region if the plurality of virtual biological attributes are different time attributes and different regional attributes, where the first virtual biological attribute includes a first time attribute and a first regional attribute, the different time attributes represent different time periods, the first time attribute represents a first time period, the different regional attributes represent different regions, and the first regional attribute represents a first region, where the virtual character of which the virtual biological attribute is the first time attribute and the first regional attribute includes at least one of the following:

a virtual character obtained by being allowed to evolve in the first region within the first time period;

a virtual character obtained by being allowed to evolve within the first time period and allowed to be used in the first region;

a virtual character allowed to be used within the first time period and obtained by being allowed to evolve in the first region; and a virtual character allowed to be used in the first region within the first time period.

In a possible implementation, the apparatus is configured to display the virtual interaction object for obtaining the virtual character in the virtual character obtaining interface in the following manners: displaying the virtual wheel configured for obtaining the virtual character in the virtual character obtaining interface, where the virtual wheel includes the plurality of interaction regions and a virtual wheel pointer, and the virtual wheel pointer is set to be allowed to rotate in the plurality of interaction regions; and the apparatus is configured to obtain the selection operation on the first interaction region in the virtual interaction object according to the target interaction manner in the following manners: determining the target interaction manner as a rotation operation according to the virtual biological attributes corresponding to the plurality of interaction regions in the virtual wheel, and obtaining a rotation operation performed on the virtual wheel pointer to stop the virtual wheel pointer in the first interaction region.

In a possible implementation, the apparatus is configured to obtain the rotation operation performed on the virtual wheel pointer to stop the virtual wheel pointer in the first interaction region in the following manners:

obtaining the rotation operation performed on the virtual wheel pointer, where the rotation operation is configured for controlling the virtual wheel pointer to rotate in a clockwise or counterclockwise direction;

displaying a first display special effect when the virtual wheel pointer rotates to the first interaction region during rotation of the virtual wheel pointer, where the first display special effect corresponds to the first interaction region, and the first display special effect is configured for indicating the first virtual biological attribute;

displaying a second display special effect when the virtual wheel pointer rotates to a second interaction region during the rotation of the virtual wheel pointer, where the second interaction region is configured for obtaining a second virtual character, the second virtual character corresponds to a second virtual biological attribute, the second display special effect is configured for indicating the second virtual biological attribute, and the second virtual biological attribute is different from the first virtual biological attribute; and displaying a third display special effect when the virtual wheel pointer stops in the first interaction region, where the third display special effect is configured for indicating that a virtual biological attribute of a currently obtained virtual character is the first virtual biological attribute.

In a possible implementation, the apparatus is configured to determine the target interaction manner as the rotation operation according to the virtual biological attributes corresponding to the plurality of interaction regions in the virtual wheel, and obtain the rotation operation performed on the virtual wheel pointer to stop the virtual wheel pointer in the first interaction region in the following manners:

when the plurality of virtual biological attributes represent different time attributes, the virtual wheel being a virtual clock wheel, determining the rotation operation as a clock rotation operation, and obtaining a clock rotation operation performed on a virtual clock wheel pointer to stop the virtual clock wheel pointer in the first interaction region, where the virtual wheel includes the virtual clock wheel; or when the plurality of virtual biological attributes represent different regional attributes, determining the rotation operation as a map rotation operation, and obtaining a map rotation operation performed on a virtual map wheel pointer to stop the virtual map wheel pointer in the first interaction region, where the virtual wheel includes the virtual map wheel.

In a possible implementation, the apparatus is configured to display the virtual interaction object for obtaining the virtual character in the virtual character obtaining interface in the following manners:

when a preset task is completed, displaying the virtual interaction object in the virtual character obtaining interface according to a task attribute of the preset task, where there is a correspondence between the task attribute of the preset task and the attribute type, and the task attribute is configured for representing a completion result of the preset task or a task type of the preset task.

In a possible implementation, the apparatus is configured to display the virtual interaction object in the virtual character obtaining interface according to the task attribute of the preset task in the following manners:

displaying the virtual interaction object in the virtual character obtaining interface when the completion result of the preset task represents a first completion degree if the task attribute is configured for representing the completion result of the preset task, where the plurality of virtual biological attributes include different virtual biological attributes belonging to a first attribute type; and displaying the virtual interaction object in the virtual character obtaining interface when the completion result of the preset task represents a second completion degree if the task attribute is configured for representing the completion result of the preset task, where the plurality of virtual biological attributes include different virtual biological attributes belonging to a second attribute type, where the first completion degree is different from the second completion degree, and the first attribute type is different from the second attribute type.

In a possible implementation, the apparatus is configured to display the virtual interaction object in the virtual character obtaining interface according to the task attribute of the preset task in the following manners:

displaying the virtual interaction object in the virtual character obtaining interface when the completion result of the preset task represents a first task type if the task attribute is configured for representing the task type of the preset task, where the plurality of virtual biological attributes include different virtual biological attributes belonging to a first attribute type; and displaying the virtual interaction object in the virtual character obtaining interface when the completion result of the preset task represents a second task type if the task attribute is configured for representing the task type of the preset task, where the plurality of virtual biological attributes include different virtual biological attributes belonging to a second attribute type, where the first task type is different from the second task type, and the first attribute type is different from the second attribute type.

In a possible implementation, the apparatus is configured to obtain the selection operation on the first interaction region of the plurality of interaction regions according to the target interaction manner in the following manners:

obtaining a direction control operation, where the direction control operation is configured for determining the first interaction region; and selecting the first interaction region and obtaining the selection operation on the first interaction region if the direction control operation stays in the first interaction region for more than a preset duration.

According to an aspect of this application, a computer program product is provided, the computer program product including a computer program, and the computer program including program code configured for performing the method shown in the flowchart. In such an embodiment, the computer program may be downloaded and installed from a network through a communication part 1509, and/or installed from a removable medium 1511. When the computer program is executed by a central processing unit 1501, various functions provided in the embodiments of this application are executed.

The sequence numbers of the foregoing embodiments of this application are merely for description purpose, and do not indicate the preference among the embodiments.

Figure 15:
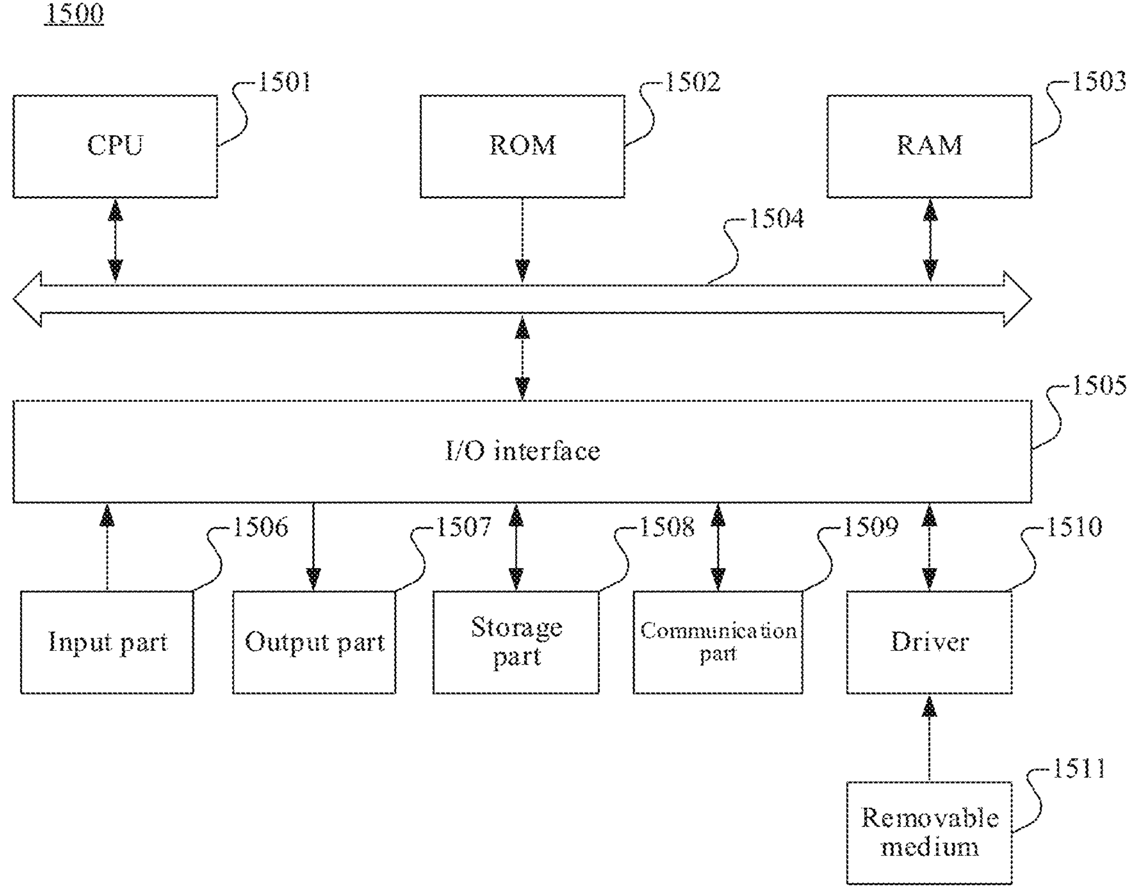
FIG. 15 is a schematic structural diagram of an exemplary virtual character obtaining product according to an embodiment of this application.

FIG. 15 is a schematic block structural diagram of a computer system configured to implement an electronic device according to an embodiment of this application.

A computer system 1500 of the electronic device shown in FIG. 15 is merely an example, and does not constitute any limitation on functions and use ranges of the embodiments of this application.

As shown in FIG. 15, the computer system 1500 includes a central processing unit (CPU) 1501. The CPU 1101 may perform various appropriate actions and processing according to a program stored in a read-only memory (ROM) 1502 or a program loaded from a storage portion 1508 into a random access memory (RAM) 1503. The RAM 1503 further stores various programs and data required for operating the system. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard and a mouse, or the like; an output part 1507 including a cathode ray tube (CRT), a liquid crystal display (LCD), a speaker, or the like; a storage part 1508 including hard disk, or the like; and the communication part 1509 including a network interface card such as a local area network card, a modem, or the like. The communication part 1509 performs communication processing by using a network such as the Internet. A drive 1150 is also connected to the I/O interface 1505 as required. The removable medium 1511, such as a magnetic disk, an optical disc, a magneto-optical disk, or a semiconductor memory, is mounted on the drive 1150 as required, so that a computer program read from the removable medium is installed into the storage part 1508 as required.

Particularly, according to an embodiment of this application, the processes described in the method flowcharts may be implemented as computer software programs. For example, this embodiment of this application includes a computer program product, the computer program product includes a computer program carried on a computer-readable medium, and the computer program includes program code configured for performing the methods shown in the flowcharts. In such an embodiment, the computer program may be downloaded and installed from the network through the communication part 1509, and/or installed from the removable medium 1511. When the computer program is executed by the CPU 1501, the various functions defined in the system of this application are executed.

Figure 16:
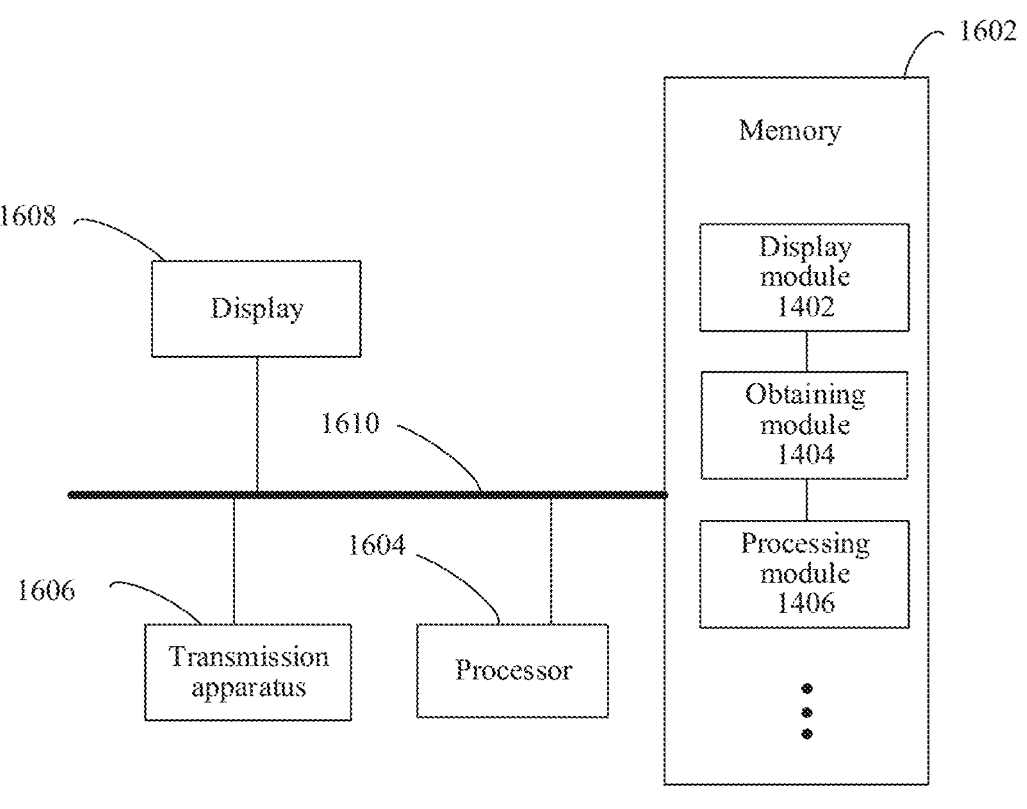
FIG. 16 is a schematic structural diagram of an electronic device according to an embodiment of this application.

According to still another aspect of the embodiments of this application, an electronic device configured to perform the foregoing virtual character obtaining method is further provided. The electronic device may be the terminal device or the server shown in FIG. 1. In this embodiment, an example in which the electronic device is the terminal device is used for description. As shown in FIG. 16, the electronic device includes a memory 1602 and a processor 1604. The memory 1602 has a computer program stored therein. The processor 1604 is configured to perform the operations in any one of the foregoing method embodiments through the computer program.

In a possible implementation, in this embodiment, the electronic device may be located in at least one of a plurality of network devices in a computer network.

In a possible implementation, in this embodiment, the processor may be configured to perform the following operations through the computer program:

S1: Display a virtual interaction object for obtaining a virtual character in a virtual character obtaining interface, the virtual interaction object including a plurality of interaction regions, each interaction region corresponding to a virtual biological attribute, and the plurality of interaction regions corresponding to a plurality of virtual biological attributes.

S2: Obtain a selection operation on a first interaction region of the plurality of interaction regions according to a target interaction manner, a virtual biological attribute corresponding to the first interaction region being a first virtual biological attribute, and the target interaction manner corresponding to attribute types of the plurality of virtual biological attributes; and S3: Obtain a first virtual character in a target virtual character set in response to the selection operation on the first interaction region and display the obtained first virtual character, a virtual biological attribute of a virtual character in the target virtual character set being the first virtual biological attribute.

In a possible implementation, a person of ordinary skill in the art can understand that the structure shown in FIG. 16 is only for illustration, and the electronic device may also be a smartphone (such as an Android phone or an iOS phone), a tablet computer, a palm computer, and a Mobile Internet Device (MID), PAD and other terminal devices. FIG. 16 does not limit the structure of the electronic device. For example, the electronic device may further include more or fewer components (such as a network interface) than those shown in FIG. 16, or have a configuration different from that shown in FIG. 16.

The memory 1602 may be configured to store a software program and a module, for example, a program instruction/module corresponding to the virtual character obtaining method and apparatus in the embodiments of this application, and the processor 1604 performs various functional applications and data processing by running the software program and the module stored in the memory 1602, that is, implementing the foregoing virtual character obtaining method. The memory 1602 may include a high-speed RAM, and may further include a non-volatile memory such as one or more magnetic storage apparatuses, a flash memory, or another non-volatile solid-state memory. In some examples, the memory 1602 may further include memories remotely disposed relative to the processor 1604, and these remote memories may be connected to the terminal through a network. Examples of the network include, but are not limited to, the Internet, an intranet, a local arca network, a mobile communication network, and a combination thereof. The memory 1602 may be specifically configured to, but is not limited to, store information such as virtual characters. As an example, as shown in FIG. 16, the memory 1602 may include, but is not limited to, the display module 1402, the obtaining module 1404, and the processing module 1406 in the foregoing virtual character obtaining apparatus. In addition, the memory may further include, but is not limited to, other module units in the foregoing virtual character obtaining apparatus. Details are not described in this example.

In a possible implementation, a transmission apparatus 1606 is configured to receive or transmit data via a network. Specific examples of the network include a wired network and a wireless network. In an example, the transmission apparatus 1606 includes an NIC. The NIC may be connected to another network device and a router by using a network cable, to communicate with the Internet or a local area network. In an example, the transmission apparatus 1606 is a radio frequency (RF) module, and is configured to wirelessly communicate with the Internet.

In addition, the foregoing electronic device may further include: a display 1608, configured to display the virtual character obtaining interface; and a connection bus 1610, configured to connect various module components in the electronic device.

In other embodiments, the terminal device or server may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network.

According to an aspect of this application, a non-transitory computer-readable storage medium is provided. A processor of a computer device reads a computer program from the computer-readable storage medium, and executes the computer program, so that the computer device performs the virtual character obtaining method provided in the various optional implementations of the virtual character obtaining aspect.

In a possible implementation, in this embodiment, a person of ordinary skill in the art may understand that all or some of the steps of the various methods in the foregoing embodiments may be implemented by a program instructing relevant hardware. The program may be stored in a computer-readable storage medium. The storage medium may include: a flash drive, a Read-Only Memory (ROM), a Random Access Memory (RAM), a magnetic disk, an optical disc, and the like.

The sequence numbers of the foregoing embodiments of this application are merely for description purpose, and do not indicate the preference among the embodiments.

When the integrated unit in the foregoing embodiments is implemented in the form of a software function unit and sold or used as an independent product, the integrated unit may be stored in the computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, the disclosed client may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected based on actual requirements to achieve the objectives of solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely preferred embodiments of this application, and a person of ordinary skill in the art may make various improvements and modifications without departing from the spirit of this application. All such improvements and refinements shall fall within the protection scope of this application.

What is claimed is:

1. A method for obtaining a virtual character performed by an electronic device, the method comprising:

displaying a virtual interaction object in a virtual character obtaining interface, the virtual interaction object comprising a plurality of interaction regions for obtaining a virtual character, each interaction region corresponding to a virtual attribute of the virtual character;

receiving a selection operation on a first interaction region of the plurality of interaction regions on the virtual interaction object according to a target interaction manner, a virtual attribute corresponding to the first interaction region having a first virtual attribute; and obtaining a first virtual character in a target virtual character set in response to the selection operation on the first interaction region and displaying the obtained first virtual character, a virtual attribute of a virtual character in the target virtual character set being the first virtual attribute.

2. The method according to claim 1, wherein the first virtual attribute represents a first time period, and the first virtual character comprises at least one of the following: a virtual character allowed to evolve within the first time period and a virtual character allowed to be used within the first time period.

3. The method according to claim 1, wherein the first virtual attribute represents a first region, and the first virtual character comprises at least one of the following: a virtual character allowed to evolve in the first region and a virtual character allowed to be used in the first region.

4. The method according to claim 1, wherein the first virtual attribute comprises a first time attribute and a first regional attribute, the first time attribute represents a first time period, and the first regional attribute represents a first region, and the first virtual character comprises at least one of the following:

a virtual character allowed to evolve in the first region within the first time period;

a virtual character allowed to evolve within the first time period and allowed to be used in the first region;

a virtual character allowed to be used within the first time period and obtained by being allowed to evolve in the first region; and a virtual character allowed to be used in the first region within the first time period.

5. The method according to claim 1, wherein the virtual interaction object is a virtual wheel, and the displaying a virtual interaction object for obtaining a virtual character in a virtual character obtaining interface comprises:

displaying the virtual wheel in the virtual character obtaining interface, wherein the virtual wheel comprises the plurality of interaction regions and a virtual wheel pointer, and the virtual wheel pointer is set to be allowed to rotate in the plurality of interaction regions; and the obtaining a selection operation on a first interaction region of the plurality of interaction regions on the virtual interaction object according to a target interaction manner comprises:

determining the target interaction manner as a rotation operation according to the virtual attributes corresponding to the plurality of interaction regions in the virtual wheel, and obtaining a rotation operation performed on the virtual wheel pointer to stop the virtual wheel pointer in the first interaction region.

6. The method according to claim 5, wherein the obtaining a rotation operation performed on the virtual wheel pointer to stop the virtual wheel pointer in the first interaction region comprises:

obtaining the rotation operation performed on the virtual wheel pointer, wherein the rotation operation is configured for controlling the virtual wheel pointer to rotate in a clockwise or counterclockwise direction;

displaying a first display special effect when the virtual wheel pointer rotates to the first interaction region during rotation of the virtual wheel pointer, wherein the first display special effect corresponds to the first interaction region, and the first display special effect is configured for indicating the first virtual attribute;

displaying a second display special effect when the virtual wheel pointer rotates to a second interaction region during the rotation of the virtual wheel pointer, wherein the second interaction region is configured for obtaining a second virtual character, the second virtual character corresponds to a second virtual attribute, the second display special effect is configured for indicating the second virtual attribute, and the second virtual biological attribute is different from the first virtual attribute; and displaying a third display special effect when the virtual wheel pointer stops in the first interaction region, wherein the third display special effect is configured for indicating that a virtual attribute of a currently obtained virtual character is the first virtual attribute.

7. The method according to claim 5, the determining the target interaction manner as a rotation operation according to the virtual attributes corresponding to the plurality of interaction regions in the virtual wheel, and obtaining a rotation operation performed on the virtual wheel pointer to stop the virtual wheel pointer in the first interaction region comprises:

when the plurality of virtual attributes represent different time attributes, the virtual wheel being a virtual clock wheel, determining the rotation operation as a clock rotation operation, and obtaining a clock rotation operation performed on a virtual clock wheel pointer to stop the virtual clock wheel pointer in the first interaction region, wherein the virtual wheel comprises the virtual clock wheel; or when the plurality of virtual attributes represent different regional attributes, determining the rotation operation as a map rotation operation, and obtaining a map rotation operation performed on a virtual map wheel pointer to stop the virtual map wheel pointer in the first interaction region, wherein the virtual wheel comprises the virtual map wheel.

8. The method according to claim 1, wherein the displaying a virtual interaction object in a virtual character obtaining interface comprises:

displaying the virtual interaction object in the virtual character obtaining interface according to a task attribute of a preset task, wherein there is a correspondence between the task attribute of the preset task and the attribute type, and the task attribute is configured for representing a completion result of the preset task or a task type of the preset task.

9. The method according to claim 1, wherein the obtaining a selection operation on a first interaction region of the plurality of interaction regions on the virtual interaction object according to a target interaction manner comprises:

obtaining a direction control operation, wherein the direction control operation is configured for determining the first interaction region; and selecting the first interaction region and obtaining the selection operation on the first interaction region when the direction control operation stays in the first interaction region for more than a preset duration.

10. An electronic device, comprising a memory and a processor, the memory having a computer program stored therein, and the computer program, when executed by the processor, causing the electronic device to perform a method for obtaining a virtual character including:

displaying a virtual interaction object in a virtual character obtaining interface, the virtual interaction object comprising a plurality of interaction regions for obtaining a virtual character, each interaction region corresponding to a virtual attribute of the virtual character;

obtain a selection operation on a first interaction region of the plurality of interaction regions on the virtual interaction object according to a target interaction manner, a virtual attribute corresponding to the first interaction region having a first virtual attribute; and obtaining a first virtual character in a target virtual character set in response to the selection operation on the first interaction region and displaying the obtained first virtual character, a virtual attribute of a virtual character in the target virtual character set being the first virtual attribute.

11. The electronic device according to claim 10, wherein the first virtual attribute represents a first time period, and the first virtual character comprises at least one of the following: a virtual character allowed to evolve within the first time period and a virtual character allowed to be used within the first time period.

12. The electronic device according to claim 10, wherein the first virtual attribute represents a first region, and the first virtual character comprises at least one of the following: a virtual character allowed to evolve in the first region and a virtual character allowed to be used in the first region.

13. The electronic device according to claim 10, wherein the first virtual attribute comprises a first time attribute and a first regional attribute, the first time attribute represents a first time period, and the first regional attribute represents a first region, and the first virtual character comprises at least one of the following:

a virtual character allowed to evolve in the first region within the first time period;

a virtual character allowed to evolve within the first time period and allowed to be used in the first region;

a virtual character allowed to be used within the first time period and obtained by being allowed to evolve in the first region; and a virtual character allowed to be used in the first region within the first time period.

14. The electronic device according to claim 10, wherein the virtual interaction object is a virtual wheel, and the displaying a virtual interaction object for obtaining a virtual character in a virtual character obtaining interface comprises:

displaying the virtual wheel in the virtual character obtaining interface, wherein the virtual wheel comprises the plurality of interaction regions and a virtual wheel pointer, and the virtual wheel pointer is set to be allowed to rotate in the plurality of interaction regions; and the obtaining a selection operation on a first interaction region of the plurality of interaction regions on the virtual interaction object according to a target interaction manner comprises:

determining the target interaction manner as a rotation operation according to the virtual attributes corresponding to the plurality of interaction regions in the virtual wheel, and obtaining a rotation operation performed on the virtual wheel pointer to stop the virtual wheel pointer in the first interaction region.

15. The electronic device according to claim 14, wherein the obtaining a rotation operation performed on the virtual wheel pointer to stop the virtual wheel pointer in the first interaction region comprises:

obtaining the rotation operation performed on the virtual wheel pointer, wherein the rotation operation is configured for controlling the virtual wheel pointer to rotate in a clockwise or counterclockwise direction;

displaying a first display special effect when the virtual wheel pointer rotates to the first interaction region during rotation of the virtual wheel pointer, wherein the first display special effect corresponds to the first interaction region, and the first display special effect is configured for indicating the first virtual attribute;

displaying a second display special effect when the virtual wheel pointer rotates to a second interaction region during the rotation of the virtual wheel pointer, wherein the second interaction region is configured for obtaining a second virtual character, the second virtual character corresponds to a second virtual attribute, the second display special effect is configured for indicating the second virtual attribute, and the second virtual attribute is different from the first virtual attribute; and displaying a third display special effect when the virtual wheel pointer stops in the first interaction region, wherein the third display special effect is configured for indicating that a virtual attribute of a currently obtained virtual character is the first virtual attribute.

16. The electronic device according to claim 14, the determining the target interaction manner as a rotation operation according to the virtual attributes corresponding to the plurality of interaction regions in the virtual wheel, and obtaining a rotation operation performed on the virtual wheel pointer to stop the virtual wheel pointer in the first interaction region comprises:

when the plurality of virtual attributes represent different time attributes, the virtual wheel being a virtual clock wheel, determining the rotation operation as a clock rotation operation, and obtaining a clock rotation operation performed on a virtual clock wheel pointer to stop the virtual clock wheel pointer in the first interaction region, wherein the virtual wheel comprises the virtual clock wheel; or when the plurality of virtual attributes represent different regional attributes, determining the rotation operation as a map rotation operation, and obtaining a map rotation operation performed on a virtual map wheel pointer to stop the virtual map wheel pointer in the first interaction region, wherein the virtual wheel comprises the virtual map wheel.

17. The electronic device according to claim 10, wherein the displaying a virtual interaction object in a virtual character obtaining interface comprises:

displaying the virtual interaction object in the virtual character obtaining interface according to a task attribute of a preset task, wherein there is a correspondence between the task attribute of the preset task and the attribute type, and the task attribute is configured for representing a completion result of the preset task or a task type of the preset task.

18. The electronic device according to claim 10, wherein the obtaining a selection operation on a first interaction region of the plurality of interaction regions on the virtual interaction object according to a target interaction manner comprises:

obtaining a direction control operation, wherein the direction control operation is configured for determining the first interaction region; and selecting the first interaction region and obtaining the selection operation on the first interaction region when the direction control operation stays in the first interaction region for more than a preset duration.

19. A non-transitory computer-readable storage medium, having a computer program stored therein, the computer program, when executed by a processor of an electronic device, causing the electronic device to perform a method for obtaining a virtual character including:

displaying a virtual interaction object in a virtual character obtaining interface, the virtual interaction object comprising a plurality of interaction regions for obtaining a virtual character, each interaction region corresponding to a virtual attribute of the virtual character;

receiving a selection operation on a first interaction region of the plurality of interaction regions on the virtual interaction object according to a target interaction manner, a virtual attribute corresponding to the first interaction region having a first virtual attribute; and obtaining a first virtual character in a target virtual character set in response to the selection operation on the first interaction region and displaying the obtained first virtual character, a virtual attribute of a virtual character in the target virtual character set being the first virtual attribute.

20. The non-transitory computer-readable storage medium according to claim 19, wherein the virtual interaction object is a virtual wheel, and the displaying a virtual interaction object for obtaining a virtual character in a virtual character obtaining interface comprises:

displaying the virtual wheel in the virtual character obtaining interface, wherein the virtual wheel comprises the plurality of interaction regions and a virtual wheel pointer, and the virtual wheel pointer is set to be allowed to rotate in the plurality of interaction regions; and the obtaining a selection operation on a first interaction region of the plurality of interaction regions on the virtual interaction object according to a target interaction manner comprises:

determining the target interaction manner as a rotation operation according to the virtual attributes corresponding to the plurality of interaction regions in the virtual wheel, and obtaining a rotation operation performed on the virtual wheel pointer to stop the virtual wheel pointer in the first interaction region.

* * * * *